United States Patent
Kirk et al.

(10) Patent No.: US 9,978,425 B2
(45) Date of Patent: May 22, 2018

(54) METHOD AND DEVICE FOR ASSOCIATING FRAMES IN A VIDEO OF AN ACTIVITY OF A PERSON WITH AN EVENT

(71) Applicant: adidas AG, Herzogenaurach (DE)

(72) Inventors: Robert Frank Kirk, Herzogenaurach (DE); Constantin Zwick, Herzogenaurach (DE); Dominik Schuldhaus, Herzogenaurach (DE); Bjoern Michael Eskofier, Herzogenaurach (DE); Harald Körger, Herzogenaurach (DE); Maike Petra Stöve, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 53 days.

(21) Appl. No.: 15/137,092

(22) Filed: Apr. 25, 2016

(65) Prior Publication Data
US 2016/0314818 A1    Oct. 27, 2016

(30) Foreign Application Priority Data
Apr. 23, 2015   (DE) .......................... 10 2015 207 415

(51) Int. Cl.
*H04N 5/77* (2006.01)
*H04N 9/80* (2006.01)
(Continued)

(52) U.S. Cl.
CPC .............. *G11B 27/11* (2013.01); *G06F 1/163* (2013.01); *G06F 1/1694* (2013.01);
(Continued)

(58) Field of Classification Search
CPC ............ H04N 5/77; H04N 9/80; H04N 5/765; H04N 5/932
(Continued)

(56) References Cited

U.S. PATENT DOCUMENTS

| 6,709,351 B2* | 3/2004 | Hori ....................... A63B 63/00 463/3 |
| 8,001,062 B1* | 8/2011 | Gargi .................. G06K 9/00516 706/12 |

(Continued)

FOREIGN PATENT DOCUMENTS

| DE | 102006060482 | 6/2008 |
| WO | 2002/067187 | 8/2002 |

OTHER PUBLICATIONS

Breiman, "Random Forests", Machine Learning, vol. 45, 2001, pp. 5-32.
(Continued)

*Primary Examiner* — Daquan Zhao
(74) *Attorney, Agent, or Firm* — Kilpatrick Townsend & Stockton LLP

(57) ABSTRACT

Described are methods and systems for associating frames in a video of an activity of a person with an event. The methods include recording a video of an activity of a person; storing a time-series of a plurality of sensor data (82) obtained from a sensor assembly (12) of at least one sensor (31, 32, 33, 34, 35) coupled to the person while the person is performing the activity; synchronizing the video with the sensor data (82); detecting an event in the time-series; and associating the event with at least one corresponding frame in the video showing the event.

36 Claims, 6 Drawing Sheets

(51) Int. Cl.

| | |
|---|---|
| *G11B 27/11* | (2006.01) |
| *G11B 27/031* | (2006.01) |
| *G11B 27/10* | (2006.01) |
| *G11B 27/19* | (2006.01) |
| *G11B 27/30* | (2006.01) |
| *G06F 1/16* | (2006.01) |
| *G06F 3/0484* | (2013.01) |
| *G06K 9/00* | (2006.01) |
| *G06K 9/62* | (2006.01) |
| *G11B 27/022* | (2006.01) |
| *H04N 5/765* | (2006.01) |
| *H04N 5/932* | (2006.01) |

(52) U.S. Cl.
CPC ...... *G06F 3/04842* (2013.01); *G06F 3/04845* (2013.01); *G06K 9/00724* (2013.01); *G06K 9/00751* (2013.01); *G06K 9/6263* (2013.01); *G11B 27/022* (2013.01); *G11B 27/031* (2013.01); *G11B 27/10* (2013.01); *G11B 27/19* (2013.01); *G11B 27/3036* (2013.01); *H04N 5/77* (2013.01); *G06K 2009/00738* (2013.01)

(58) Field of Classification Search
USPC .................. 386/228, 239, 248, 200, 201
See application file for complete search history.

(56) References Cited

U.S. PATENT DOCUMENTS

| | | |
|---|---|---|
| 8,702,516 B2 | 4/2014 | Bentley et al. |
| 9,497,407 B2 * | 11/2016 | Lokshin ............... H04N 5/77 |
| 2002/0115047 A1 | 8/2002 | McNitt et al. |
| 2012/0123733 A1 | 5/2012 | Lo et al. |
| 2012/0167684 A1 | 7/2012 | Hwang et al. |
| 2013/0130843 A1 | 5/2013 | Burroughs et al. |
| 2013/0245966 A1 | 9/2013 | Burroughs et al. |
| 2013/0274635 A1 | 10/2013 | Coza et al. |
| 2013/0274904 A1 | 10/2013 | Coza et al. |
| 2014/0334796 A1 | 11/2014 | Galant et al. |
| 2015/0105884 A1 | 4/2015 | Ellis |
| 2016/0049173 A1 * | 2/2016 | Anderson ............. G11B 27/10 386/241 |

OTHER PUBLICATIONS

Office Action, German Patent Application No. DE102015207415.3, dated Oct. 30, 2015, 8 pages.

Duda et al., "Pattern Classification", John Wiley & Sons, 2nd Edition, 2000.

Massy, "Principal Components Regression in Exploratory Statistical Research", American Statistical Association Journal, vol. 60, 1965, pp. 234-256.

Schölkopf et al., "Estimating the Support of a High-Dimensional Distribution", Neural Computation, vol. 13, 2001, 1443-1471.

Smola et al., "A Tutorial on Support Vector Regression", Statistics and Computing, vol. 14, 2004, pp. 199-222.

Vetterli et al., "Wavelets and Filter Banks: Theory and Design", IEEE Transactions on Signal Processing, vol. 40, No. 9, 1992, pp. 2207-2232.

Zhang et al., "Physical Activity Classification Using the GENEA Wrist-Worn Accelerometer", Medicine & Science in Sports & Exercise, vol. 44, No. 4, 2012, 742-748.

Rencher et al., "Methods of Multivariate Analysis", 3rd edition, John Wiley & Sons, 2012.

Theodoridis et al., "Pattern Recognition", Elsevier, 4th edition, 2008.

European Application No. 16166159.0, Extended European Search Report dated Sep. 26, 2016, 7 pages.

* cited by examiner

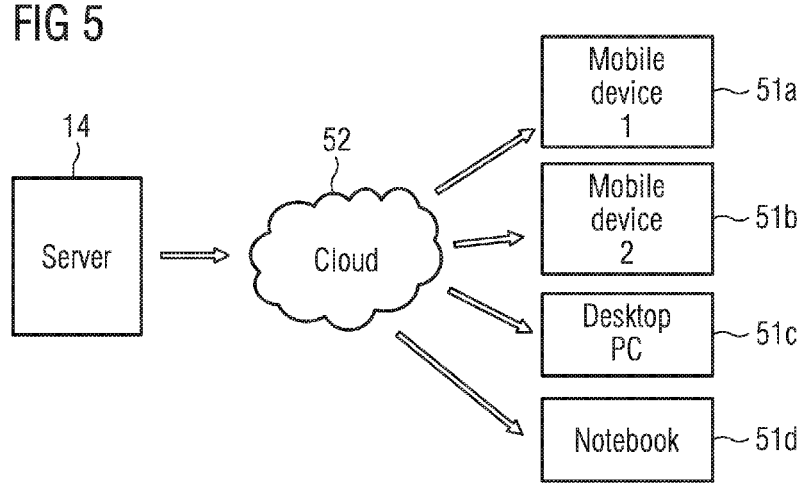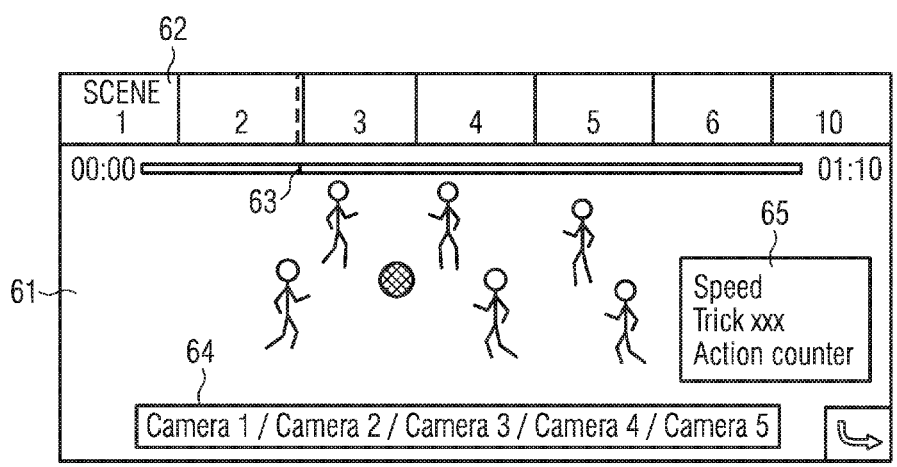

METHOD AND DEVICE FOR ASSOCIATING FRAMES IN A VIDEO OF AN ACTIVITY OF A PERSON WITH AN EVENT

CROSS REFERENCE TO RELATED APPLICATION

This application is related to and claims priority benefits from German Patent Application No. DE 10 2015 207 415.3, filed on Apr. 23, 2015, entitled Method and device for associating frames in a video of an activity of a person with an event ("the '415.3 application"). The '415.3 application is hereby incorporated herein in its entirety by this reference.

FIELD OF THE INVENTION

The present invention relates to a method and a system for associating frames in a video of an activity of a person, with an event.

BACKGROUND

The analysis of human activities is necessary for different applications, like medical assessments, smart environments, and sports. Sports applications are of special interest for both professional and recreational use. Sports applications include coordination and performance analysis of athletes. Monitoring athletes while training or competing is essential to providing pertinent feedback. Furthermore, a feedback system may motivate a person to increase daily sports activities and improve individual fitness.

For example, athletes performing in a sports match desire a video summary of their performances, such as a video showing their soccer kicks or tricks, to obtain feedback and use to improve their abilities. However, watching the entire sports activity, such as a soccer match, and cutting the relevant sequences manually for each player in order to provide him with a video summary is a time-consuming task. Thus, this kind of analysis is done only in the professional area (for example, prime league soccer clubs) where a staff of trainers and assistants supports the athletes. In other areas of mass and recreational sports, these kinds of video analyses and video summaries are not produced because of their time-consuming and elaborate nature.

On the other hand, body worn inertial-magnetic sensors also may be used to analyze human activities. Body worn inertial-magnetic sensors may capture kinematics of human motion by evaluating the movement of an integrated mass. This movement is caused by inertial forces. Alternatively, these sensors may capture orientation of human motion by evaluating the sensor's orientation with respect to external magnetic fields. Such sensors offer benefits like miniaturization, being light-weight, and being inexpensive. These sensors may be integrated in sportswear and acquire movement and orientation data over a long period of time in unconstrained environments. Data acquired by such sensors may be processed either in real-time (online processing), or may be stored for later processing when the particular activity is finished (off-line processing).

An example of real-time processing is an athlete wearing a body sensor network including inertial and/or magnetic sensors and measuring the accelerations and angular velocities at different parts of the athlete's body. Acquired data is transmitted to a mobile device by wireless technology like Bluetooth®, BTLE (Bluetooth low energy), WLAN, Zig-Bee®, ANT®, or Ant+. The mobile device may evaluate and interpret the data using real-time processing. Parameters like the number of steps, step sizes, running speed, running distance, and speed. Energy expenditure of the athlete may be computed based on the data, and performance feedback may be provided to the athlete by vision, speech, or vibration. Real-time processing demands feedback until a certain timestamp.

For off-line processing, data from the sensors is stored in a memory. For example, the sensors may be connected to a data logger by thin wires. Alternatively, the sensors may transmit the data to the data logger wirelessly, for example, by any of the wireless technologies mentioned above. After the activity, the data logger is connected to a computer, for example, via USB or any other suitable connection, and the data is transferred to the computer for off-line processing. The data is then processed on the computer to obtain, for example, running distance, speed, or energy expenditure.

Current online and off-line processing methods of sensor-based data quantify activities, which last over a long period of time, like running. Thus, these processing methods do not quantify short, frequently occurring events in sports, like kicking in soccer, tennis strokes, or lay-ups in basketball. An event is defined as a part of a human activity that has a short and restricted duration.

In sum, video based systems used to analyze human activity, particularly a sports activity, and used to provide a video feedback or summary are time-consuming and limited to the professional area. Moreover, current methods that process data acquired from body-worn sensors deliver summary statistics relating to an entire activity (for example, a match), but do not focus on particular events (such as shots). Furthermore, it is not possible for current processing methods to analyze a motion sequence (such as a kick) in detail from data acquired from body-worn sensors.

For example, US 2012/123733 A1 relates to a method for human movement recognition comprising the steps of: retrieving successive measuring data for human movement recognition from an inertial measurement unit; dividing the successive measuring data to generate at least one human movement pattern waveform if the successive measuring data conforms to a specific human movement pattern; quantifying the at least one human movement pattern waveform to generate at least one human movement sequence; and determining a human movement corresponding to the inertial measurement unit by comparing the at least one human movement sequence and a plurality of reference human movement sequences.

US 2012/0167684 A1 discloses a selective motion recognition apparatus using an inertial sensor. The selective motion recognition apparatus using an inertial sensor includes: a sensor unit; a selection unit that outputs a sensor selection signal; and a motion detection unit that receives angular velocity sensor data and acceleration sensor data output from the sensor unit.

U.S. Pat. No. 8,702,516 B2 is directed to the recognition of events within motion data including, but not limited to, motion capture data obtained from portable wireless motion capture elements, such as visual markers and sensors, radio frequency identification tags, and motion sensors within mobile device computer systems, or motion data calculated based on analyzed movement associated with a same user, another user, a historical user or a group of users.

According to US 2013/0274635 A1, a sensor module is physically coupled to an object during an athletic activity of a user. An athletic activity monitoring method for use with the sensor module includes the steps of detecting movement of the object, recording movement data, identifying a matching athletic motion from a plurality of reference motions by comparing the movement data to data associated with the plurality of reference motions, and providing an output to the user that identifies of the matching athletic motion.

US 2013/0274904 A1 is directed to a method for monitoring an individual engaged in athletic activity, including detecting movement of the individual at a first time, using a sensor module coupled to the individual, determining that the movement of the individual corresponds to a predetermined activation movement, entering an active state of the sensor module in response to the determination that the movement of the individual corresponds to the predetermined activation movement, and detecting movement of the individual at a second time, when the sensor module is in the active state.

It is therefore an object of the present invention to provide a method for providing a video summary of an activity of a person, in particular a sports activity, which is simple and fast, and provides the video summary immediately after the activity, without requiring time-consuming manual cutting of videos. A further object of the present invention relates to providing a corresponding system.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for associating frames in a video of an activity of a person with an event comprises recording a video of an activity of a person; storing a time-series comprising a plurality of sensor data obtained from a sensor assembly, wherein the sensor assembly comprises at least one sensor coupled to the person while the person is performing the activity; synchronizing the video with the plurality of sensor data; detecting an event in the time-series; and associating the event with at least one corresponding frame in the video showing the event.

In some embodiments, the method further comprises generating a second video showing the event of the activity of the person, wherein the second video comprises the at least one corresponding frame.

In certain embodiments, synchronizing the video with the sensor data comprises detecting a predetermined synchronization event in the time-series and detecting the predetermined synchronization event in at least one frame in the video.

The activity, in some embodiments, is a sports activity. In certain embodiments, the activity is soccer.

In some embodiments, the event is a kick, a short pass, a long pass, a short, or an act of controlling a ball.

The at least one sensor, in certain embodiments, is an accelerometer, a gyroscope, or a magnetic field sensor.

In certain embodiments, the sensor assembly comprises at least two sensors and the plurality of sensor data from each of the at least two sensors is combined in the time-series.

Recording the video of the activity of the person, in some embodiments, comprises recording the video with at least two cameras.

In some embodiments, the method further comprises saving the video in a database.

In certain embodiments, detecting the event in the time-series comprises preprocessing the time-series; segmenting the time-series into a plurality of windows; detecting each of the plurality of windows comprising at least one outlier; extracting a plurality of features from each of the plurality of windows in the time-series; and estimating an event class for each of the plurality of windows based on the plurality of features extracted from each of the plurality of windows in the time-series.

Preprocessing the time-series, in some embodiments, comprises low pass filtering and downsampling.

In some embodiments, detecting the event in the time-series further comprises segmenting the time-series into a plurality of windows, each having a fixed sized window. Detecting the event in the time-series, in certain embodiments, further comprises centering each of the plurality of windows at a center of the fixed sized window, wherein the center corresponds to a maximum peak in the time-series. In certain embodiments, detecting the event in the time-series further comprises removing the plurality of windows, in which the maximum peak at the center is below a threshold.

In certain embodiments, detecting the event in the time-series further comprises adapting a window size to at least one of a shape and an extent of the event.

In some embodiments, detecting each of the plurality of windows comprising at least one outlier comprises using at least one of a Rule based system and a one-class Support Vector Machine.

The plurality of features, in certain embodiments, are extracted from the plurality of windows which do not comprise at least one outlier.

In certain embodiments, the plurality of features are based on at least one of temporal statistics, spatio-temporal statistics, spectral statistics or ensemble statistics, by applying at least one of a wavelet analysis, a principal component analysis, PCA, or a Fast Fourier Transform (FFT).

In some embodiments, the plurality of features comprise at least one of a simple mean, a normalized signal energy, a movement intensity, a signal magnitude area, a correlation between axes, a maximum value in a window, a minimum value in a window, a maximum detail coefficient of a wavelet transform, a correlation with a template, a projection onto a principal component of a template, or a distance to an eigenspace of a template, a spectral centroid, a bandwidth, or a dominant frequency.

Detecting the event in the time-series, in some embodiments, further comprises reducing a number of the plurality of features using at least one feature selection procedure.

In certain embodiments, estimating the event class is based on at least one classifier selected from the group consisting of a Bayesian classifier, such as a Naïve Bayes classifier, a maximum margin classifier, such as a Support Vector machine, an ensemble learning algorithm, such as an AdaBoost classifier and a Random Forest classifier, a Nearest Neighbor Classifier, a neural Network classifier, a Rule based classifier, and a Tree based classifier.

In some embodiments, estimating the event class further comprises fusing at least two decisions of the at least one classifier to estimate a final prediction of the event class.

Detecting the event, in some embodiments, comprises matching the event to a template based on correlation, Matched Filtering, Dynamic Time Warping, or Longest Common Subsequence (LCS) and its sliding window variant, warping LCS.

In certain embodiments, estimating the event class comprises discriminating between at least two merged event groups containing at least two events that are similar in shape, and discriminating between the at least two events belonging to one specific group.

In some embodiments, estimating the event class is based on at least one classifier that has been trained based on a supervised training.

The method, in certain embodiments, further comprises providing a plurality of summary statistics, wherein at least a portion of the plurality of summary statistics is based on the event.

In certain embodiments, the method further comprises estimating a speed of a ball based on the time-series, if the event is associated with a kick.

In some embodiments, a system for associating frames in the video of the activity of the person with an event is adapted to perform the method.

According to certain embodiments of the present invention, a system for associating frames in a video of an activity of a person with an event comprises at least one camera for recording a video of an activity of a person; at least one sensor assembly comprising at least one sensor capable of being coupled to the person while the person is performing the activity; a memory for storing a time-series comprising a plurality of sensor data obtained from the at least one sensor; and a processor for synchronizing the video with the plurality of sensor data, detecting an event in the time-series, and associating the event with at least one corresponding frame in the video showing the event.

In some embodiments, the sensor assembly is adapted to be coupled to a body of the person. The sensor assembly, in certain embodiments, is adapted to be attached to a strap or a bracelet.

In certain embodiments, a wearable device comprises the sensor assembly.

The sensor assembly, in some embodiments, comprises the memory.

In some embodiments, the system comprises at least two cameras.

In certain embodiments, a computer program comprises a plurality of instructions, wherein the plurality of instructions instruct a computer to perform the method when the plurality of instructions are executed.

BRIEF DESCRIPTION OF THE DRAWINGS

In the following detailed description, embodiments of the invention are described referring to the following figures:

FIG. 5 illustrates how a video generated, according to certain embodiments of the invention, is distributed to mobile devices.

FIG. 6 illustrates how a video generated, according to some embodiments of the invention, may be presented to a person.

BRIEF DESCRIPTION

Figure 1:
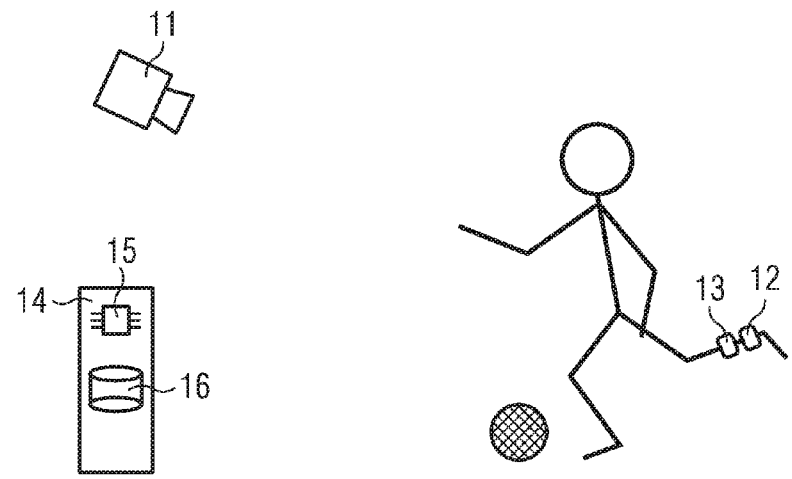
FIG. 1 shows a schematic illustration, according to some embodiments of the present invention.

According to some embodiments of the present invention, a method for associating frames in a video of an activity of a person with an event, comprises recording a video of an activity of a person; storing a time-series comprising a plurality of sensor data obtained from a sensor assembly comprising at least one sensor coupled to the person while the person is performing the activity; synchronizing the video with the plurality of sensor data; detecting an event in the time-series; and associating the event with at least one corresponding frame in the video showing the event.

The method according to the invention provides a video summary of an activity of a person, particularly a sports activity, which is simple and fast, and provides the video summary immediately. The frames of the video, which show the desired events, such as kicks or tricks of a soccer player, do not have to be cut manually, but instead are identified and selected based on the stored time-series of the sensor data. To this end, an event, such as a kick or a trick, is detected in the time-series and associated with at least one corresponding frame in the video showing the event. To enable an exact mapping of the events detected in the time-series to the relevant frames in the video, the video and the sensor data are synchronized.

The method according to the invention allows the person to automatically obtain a highlight reel (or "show reel") after an activity like a soccer match. "Highlight reel" or "show reel," in the context of the present invention, are understood as a collection of video sequences that share a common property. One common property may, for example, be that all video sequences of the highlight reel show kicks, passes, and/or tricks, of a certain player. Another highlight reel may show all defensive events of a goal keeper. Furthermore, a highlight reel may show specific tricks that a player did, for example, keepy-uppy or around-the-world. The common property does not necessarily relate to a certain player. For example, the highlight reel may show all shots made in a match above a certain ball speed (for example, 100 km/h), regardless of which player made the shot.

A sensor assembly, in the context of the present invention, is understood as having at least one sensor. The sensor assembly may comprise additional components for supporting the sensor, such as a housing, a power supply, an analog-to-digital converter, a processor or microcontroller, or a memory. The sensor assembly also may comprise a plurality of sensors, such as an accelerometer, a gyroscope, or a magnetic field sensor. In this case, the data from the different sensors may be combined into a single time-series. The sensor assembly may also comprise a memory for storing the time-series of sensor data.

The method may include using the at least one corresponding frame to generate a second video, a highlight video, showing the events of the activity of the person. In this way, the person, for example, a soccer player, may obtain a highlight video showing certain events from a match that the person is interested in seeing. For example, the highlight video may show all of the person's kicks and passes. Other examples include a highlight video showing events of predefined people, a highlight video showing all shots during a match, or a highlight video showing all tricks during a match. Another example is a highlight video that shows all shots from a best friend of a certain person.

Synchronizing the video with the sensor data may comprise detecting a predetermined synchronization event in the time-series and the predetermined synchronization event in at least one frame in the video. For example, a soccer player may perform a certain predetermined movement, which may be detected easily in the video and in the time-series of the sensor data. The detected data points in the time-series and the detected frames in the video may then obtain the same time-stamp to synchronize the video with the time-series. In this way, a simple synchronization is achieved.

Synchronizing the video with the sensor data, alternatively, or additionally may comprise receiving a wireless signal from a transmitter or a transceiver (a combined transmitter and receiver) contained in the sensor assembly. For example, the sensor assembly may comprise a RFID, NFC, Bluetooth (BT), Bluetooth Low Energy (BTLE), or WLAN module for transmitting such a signal. Thus, when the person enters a sports ground, a corresponding receiver module installed at the sports ground receives the wireless signal from the transmitter contained in the sensor assembly and synchronizes a camera with the sensor.

The wireless signal may comprise a timestamp of a real time clock (RTC) contained in the sensor assembly. This timestamp enables the camera to synchronize with the RTC of the sensor assembly, for example, by adjusting its RTC to the received timestamp. Runtime and/or processing time of the timestamp may be considered and added to the timestamp to obtain a more accurate synchronization. The sensor assembly also stores the actual time of two sample points of the recorded video (for example, the first and last frame). If an event is detected in the sensor data, the corresponding time point may be determined based on the stored actual times of the two sample points.

Alternatively, a wireless signal with a timestamp from a RTC of the camera or of the system to which the camera is connected is transmitted to the sensor assembly via e.g. RFID, NFC, Bluetooth (BT), Bluetooth Low Energy (BTLE), or WLAN. This signal enables the sensor assembly to synchronize with the camera, e.g. by adjusting its RTC to the timestamp. The runtime and/or processing time of the time stamp may be considered and added to the timestamp in order to obtain a more accurate synchronization.

The activity may be a sports activity. Video analyses and summaries are particularly desired for sports activities, but may be employed in mass and recreational sports. The method according to the invention is, in particular, suitable for sports activities, such as soccer, football, rugby, tennis, or basketball.

The activity may be soccer. Soccer is particularly suited for post-match video summaries, as it allows players to obtain training feedback and compare their performances with performances of other players. Due to soccer's variety of different movements (kick, shot, long pass, short pass, control, dribbling, corner shot, freekick), soccer is an activity very well suited for the present invention.

The event may be a kick, a short pass, a long pass, a shot, or an act of controlling a ball. These types of events are the most relevant events in soccer and provide the most useful feedback to a player.

The at least one sensor may be an accelerometer, a gyroscope, or a magnetic field sensor. These types of sensors provide the necessary information as to the movement and orientation of a body or parts of the body. Data provided by these kinds of sensors allows for a reliable detection of events. In particular, a combination of different sensors (for example, an accelerometer and a gyroscope) improves the reliability of the method, according to the invention. Sensors may be combined by fusing their sensor data and events may be detected based on the fused sensor data.

The sensor assembly may comprise two or more sensors, and the sensor data from the two or more sensors may be combined into the time-series. In this way, the accuracy of the event detection step may be improved as the data on which the detection is based is more accurate. For example, data from an accelerometer may be combined with data from a gyroscope to obtain both the acceleration and the orientation of the sensor assembly. A time-series based on acceleration and orientation allows for a more reliable detection of events than a time-series that is based on either acceleration or orientation.

The sensor assembly may also comprise a satellite navigation system module, which is capable of providing data corresponding to a location of the person. The satellite navigation system data may be used to improve the detection of the event. Furthermore, the satellite navigation system data may be used to associate the activity of the person with a corresponding geolocation. For example, a frame of the video containing a certain detected event performed during the activity of the person (such as a kick of a soccer player) may be associated with the corresponding geolocation of that event. Also, a video showing certain detected events may be associated with the corresponding geolocation. The satellite navigation system module may be based on GPS, Galileo, Glonass or a combination thereof. To save battery power, the geolocation may be updated only if the person presses a button on the sensor assembly, or a certain event is detected in the sensor data, such as a kick, pass, or trick.

The satellite navigation system data also may be used to generate a heatmap of movements of the person. A heatmap, in this context, is understood as a map, which associates a duration that the person spent at a particular location with each particular location. The duration is then mapped to a color scheme. For example, a long duration is indicated by the color red, whereas a short location is indicated by the color blue. Intermediate values are indicated by corresponding intermediate colors (colors from a spectrum of natural colors). The heatmap may be used to analyze where the person actually spent most time, for example, during a match. To this end, the heatmap may be overlaid with a picture or a schematic drawing of a playing field (such as a football ground, a tennis court, or a basketball court). In this way, the heatmap shows a position of the person.

Detecting an event in the time-series may comprise preprocessing the time-series, segmenting the time-series into a plurality of windows, detecting outliers, extracting a plurality of features from the time-series in each of the plurality of windows, and estimating an event class associated with the plurality of windows based on the plurality of features extracted from the time-series in each of the plurality of windows.

This sequence for detecting an event in the time-series is reliable, computationally inexpensive, capable for real-time processing, and may be applied to a vast spectrum of activities, in particular sports activities. These benefits may be achieved by a particular combination of steps. Thus, by preprocessing the time-series with appropriate filters and signal processing, the data may be prepared optimally for the additional method steps. By segmenting the time-series retrieved by the at least one sensor in a plurality of windows, the processing of the data may be focused to a limited amount of data given by a window size. By detecting outliers, undesired windows may be removed. By extracting a plurality of features from the sensor data in each of the windows, the dimension of the data may be reduced. For example, if each window comprises a few hundred data points, extracting about a dozen relevant features results in a significant reduction of computational costs. Furthermore, the step of estimating an event class associated with the plurality of windows only needs to operate on the extracted features, and not on the full set of data points in each window.

Being computationally inexpensive, this sequence of steps for detecting the event is particularly suitable for real-time processing of the sensor data. Thus, the method may be implemented in the sensor assembly itself, which is, for example, attached to or integrated in a shoe, an article of apparel, or a wearable device (a computer that is incorporated into items of clothing and accessories which may comfortably be worn on the body) worn by the person, or may be directly coupled to the person, for example, to his/her skin. The sensor assembly may be placed on the shoe, within the shoe (in an upper, midsole, or outsole), or in a sockliner of the shoe (in an insole, which may be removable). The device may also be a wearable device. A wearable device is understood as an electronic device, which may be worn by the person and is attached to the person's body, either directly or indirectly. A wearable device may, for example, be a watch, a bracelet, glasses, a hat, clothing, apparel, or a strap to be worn at an extremity.

The sensor assembly may be worn at a lower leg, such as a shin area or an ankle. Depending on the sport, the sensor assembly also may be worn near a wrist (for example, in sports like tennis or basketball). The sensor assembly also may be integrated in sports equipment, which the person uses for performing the activity of interest, for example, in a tennis racket, soccer ball, basketball or skateboard.

The sensor assembly may comprise a central processing unit, which is capable of performing the sequence of steps. To this end, the processing unit may execute corresponding computer readable instructions.

Preprocessing the time-series may comprise low pass filtering and downsampling. Low pass filtering is applied for noise reduction. Downsampling reduces the amount of data to be processed and allows for more efficient implementation.

Preprocessing the time-series may include computation of the signal magnitude vector (SMV) of the accelerometer data. A thresholding procedure may be applied to the SMV to determine energy rich regions in the signal. The time-series may be segmented in a plurality of windows with a fixed window size, for example, segmented around the energy rich regions mentioned before. For example, the windows may be centered at maximum peaks in the time-series. These windows, with a fixed size, may be easily implemented and are computationally inexpensive.

Alternatively, window size may be adapted to a shape and/or an extent of the event. Since the length of events may be different, for example, length of control versus length of a shot, finding an optimal window size is challenging. Therefore, the window size may be adapted to the shape and/or extent of the event. The windows with a maximum peak at a center that is below a threshold may be removed. In this way, the method may focus on the windows that are promising candidates for containing a relevant event.

The time-series also may be segmented into a plurality of windows by matching the event with a template of an event that is defined using known signals of pre-recorded events. The matching may be based on correlation, Matched Filtering, Dynamic Time Warping, or Longest Common Subsequence (LCS) and its sliding window variant, warping LCS.

Segmented windows may include undesired movements, such as running, walking and tackling. Therefore, an outlier detection procedure may be applied, such as Rule based systems or one-class Support Vector Machines. The segmented windows, which pass the outlier detection procedure, are processed further.

The event class may comprise at least the event to be determined and an outlier class associated with the sensor data that does not belong to a specific event. In this way, discrimination may be made between events which are of interest for the particular activity and all other events.

The plurality of features may be based on at least one of temporal, spatio-temporal, spectral, or ensemble statistics by applying, for example, wavelet analysis, Fast Fourier Transform (FFT), or principal component analysis (PCA). The mentioned statistics and transforms are suitable to derive features from the time-series in each of the windows, which are as non-redundant as possible, and allow for a reliable determination of events.

The features may be based on at least one of simple mean, normalized signal energy, movement intensity, signal magnitude area, correlation between axes, maximum value in a window, minimum value in a window, maximum detail coefficient of a wavelet transform, correlation with a template, projection onto a principal component of a template, distance to an eigenspace of a template, spectral centroid, bandwidth, or dominant frequency. These kinds of features have been found to allow for a reliable determination of events associated with human activity.

The method may comprise reducing a number of features by feature selection procedures. Reducing the number of features by focusing on the relevant features reduces computational complexity. For example, the features may be selected based on sequential forward selection.

The event class may be estimated based on a Bayesian Classifier such as Naïve Bayes classifier, a maximum margin classifier such as Support Vector Machine, an ensemble learning algorithm such as AdaBoost classifier and a Random Forest classifier, a Nearest Neighbor classifier, a Neural Network classifier, a Rule based classifier, or a Tree based classifier. These methods have been found to provide for a reliable classification of events associated with human activity.

The event class also may be determined by fusing decisions of several of the above mentioned classifiers (decision level fusion) to obtain a more reliable classification.

The method may further comprise detecting the event by matching the event to a template using correlation, Matched Filtering, Dynamic Time Warping, or Longest Common Subsequence (LCS) and its sliding window variant, warping LCS.

Estimating the event class may comprise discriminating between merged event groups containing events, which are similar in shape, and discriminating between single events belonging to one specific group. Thus, the classification of different events is performed in a hierarchical manner. Events may be grouped in instances with similar signal shape, such as control and short pass, or long pass and shot. Different classification systems may be used to classify groups of events and to distinguish between single event classes.

Estimating may be based on a classifier, which has been trained based on supervised learning. Supervised learning allows the classifier to be adapted to certain classes of events, such as kicks, shots, or passes, to certain types of athletes, such as professional, amateur, or recreational, and/or to a specific person.

Further improvement of estimating may be reached by online learning. Online learning allows the classifier to adapt to the person without human interaction. The classifier is retrained with additional detected events, for example, in a game.

The method may be performed in real-time. Real-time analysis may be used to predict certain events and to initiate certain measures. For example, sports equipment may be adapted for a kick or hit prior to the impact of a ball. Real-time analysis is also important to provide real-time feedback to the person. For example, the person may be warned instantly about excess stress or other unhealthy conditions.

The sensor assembly may be attached to a strap to be worn at an extremity of the body of the person. Such an arrangement has the advantage that the movements of the extremity may immediately be measured, and certain events, such as kicks in soccer, may be reliably determined. Furthermore, gathering of the sensor data is independent of footwear and other equipment, so a soccer player may use whatever shoe and/or shinguard he/she chooses. The strap may be made from textile material, leather, artificial leather, or plastics. A strap is understood as any loop-like arrangement, which is capable of being worn at an extremity of a person's body, such as an arm and/or a leg. Another example is a wrist-worn wearable for sports such as tennis (for forehand/backhand detection), golf (for full swing, half swing, putt detection), as well as for racket and club sports.

The sensor assembly may be permanently attached or integrated to the strap, for example, by gluing, welding or stitching. Alternatively, the sensor assembly may be removably attached to the strap, for example, by a hook-and-loop fastener or a snap button.

Furthermore, the sensor assembly may be attached to or integrated in a shoe or article of apparel worn by the person, or directly coupled to the person, for example, to his/her skin. For example, the sensor may be placed on the shoe, within the shoe (in an upper, midsole, outsole), or in a sockliner of the shoe (in an insole, which may be removable). The shoe may comprise a cavity into which the sensor assembly is placed. The sensor assembly also may be attached to or integrated into a wearable device like a watch, a bracelet, or a watch-like device, which is able to show the current time. The sensor assembly may be worn at a lower leg area, such as a shin area or an ankle.

The sensor assembly also may be integrated in sports equipment, which the person uses for performing the activity of interest, for example, in a tennis racket, soccer ball, basketball or skateboard.

The sensor data of different devices on different body parts may be fused to increase the accuracy of the method. For example, a soccer player may have multiple sensors arranged at his leg (one at the foot, one at the shin and one at the thigh), and a tennis or golf player may have multiple sensors arranged at his arm (one at the wrist, and one at the upper arm), and optionally at his leg. The sensor data of these different sensors are then fused, and the event is detected based on combined sensor data, to obtain a better estimate of the kinds of motions performed by the player.

Feedback may be provided to the person based on the event that has been estimated. Thus, for example, the person may be informed about his/her performance during training or a match. Such feedback may be provided in real-time. For example, feedback may be provided on a display of a smartphone (for example, showing running distance or number of shots), on a display of a watch, on a display of the sensor assembly, or on an external display arranged at a sports ground.

Feedback also may be provided that is not in realtime. For example, feedback may be provided after an activity (after a match or training), in a locker room (on a display mounted on a wall or on a person's electronic device like a smartphone or a tablet PC), or at a person's home. To this end, the feedback data may be stored in a database or in a cloud storage.

Summary statistics may be provided based on a detected event. In this way, the statistics may be tailored to specific classes of events. For example, in a soccer application, statistics about number and intensity of shots, shot speed, time on ball, number of long passes and short passes, and duration of dribblings, may be provided. Summary statistics for basketball may comprise number of passes and dribblings, the time of ball possession, or intensity of jumps. Summary statistics for tennis may comprise number of hits, estimated ball speeds, percentage of forehand and backhand hits, or number and intensity of services. Those statistics may be provided if the tennis player is equipped with a sensor assembly near his hand. If the tennis player is additionally equipped with a sensor assembly near one or both of his feet, running statistics may be provided, such as total distance and number of sprints (to the net).

The summary statistics may be combined with a video showing detected events of a certain player (for example, all of the player's shots). In this way, a combined summary or a combined feedback is obtained.

Summary statistics based on the detected event (and optionally a generated video of certain events) may be transferred to other people like a trainer, spectators, or other people interested in those statistics. The transfer may be over the internet via a live stream. The transfer may be based on media such as Wifi, WLAN, BT, BTLE, NFC, RFID, USB, Ethernet, and Thunderbolt. Based on the summary statistics (and optionally the generated video of certain events), the player may obtain feedback from a trainer or a scout.

Furthermore, based on the summary statistics (and optionally generated video of certain events), a special area in a store or a stadium may be unlocked, depending on how well the player performed. For example, if the player achieved a certain number of ball contacts during a match, the player is awarded access to a certain area in a store or stadium.

The sensor data also may be used to provide a trick counter (the number of tricks like step overs or around-theworlds performed), a football activity monitor, a keepy-uppy tracker (counting ball contacts while juggling the ball), "around the world" (holding the ball up with one leg and trying to move the leg around the ball before it hits the ground), or a 1-on-1 counter (counting how often the player engaged in a one-on-one situation on the field, for example, trying to bypass and/or tricking the opponent). For example, the sensor data may be analyzed to determine the number of ball contacts a player had without allowing the ball to hit the ground (keepy uppy). The statistics mentioned above may be determined based on corresponding detected events, for example, an event may be the contact of a foot with the ball (for keepy-uppy) or a circular movement (for "around the world"). If an event associated with a kick is detected, a ball speed may be estimated based on the sensor data. Thus, the person may obtain feedback about his/her kicking performance. The ball speed may be estimated by preprocessing, feature extraction and regression. The sensor data may be segmented and features may be computed for each segmented region. Different regression techniques may be applied, which use the computed features as input, as will be described in more detail below.

The method may comprise obtaining feedback regarding the detected event, such as a certain soccer trick performed by a player. The sensor data gathered while the trick was performed may be analyzed to determine how well the trick was performed. For example, a smartphone, tablet PC, notebook, or smartwatch shows the player a trick to perform, the player performs the trick, and the player gets a feedback regarding the accuracy of his movements. The event corresponding to the trick may be determined as described above.

A system for associating frames in a video of an activity of a person with an event, may be adapted to perform a method as described above.

In addition to automatic detection of events, the person may determine important scenes. Therefore, a movement has to be defined, such as by tapping on the sensor assembly. To this end, the sensor assembly may have a button, a switch a touch sensitive area. In order to indicate the desired movement to the sensor assembly, the person may be required to perform a double tap or a triple tap. Alternatively, the sensor assembly may be in communication with a mobile device (for example, a smartphone or tablet PC) and the person may indicate the desired movement to the sensor assembly via the mobile device. For example, the mobile device may show buttons denoted "go" and "stop" on its display which the person presses to indicate a beginning and an end of a certain event (such as a trick that he performs). A certain force may need to be exerted on a touch sensitive area or a certain gesture may need to be performed thereon.

The sensor data of the specific movement may be used to train a classification system including, for example, Hidden Markov Model or one-class Support Vector Machine. The trained system may be integrated into the above described algorithmic pipeline.

Another aspect of the present invention relates to a system for associating frames in a video of an activity of a person with an event, comprising: at least one camera for recording a video of an activity of a person; a sensor assembly comprising at least one sensor capable of being coupled to a person while the person is performing the activity; a memory for storing a time-series comprising a plurality of sensor data obtained from the at least one sensor; and a processor for synchronizing the video with the sensor data, detecting an event in the time-series, and associating the event with at least one corresponding frame in the video showing the event.

The sensor assembly may be adapted to be coupled to a body of the person. This allows for direct and immediate transmission of forces from the body to the sensor, which improves the accuracy of the measured data.

The sensor assembly may be adapted to be attached to a shoe. Such an arrangement has the benefit that the movements of the shoe may be measured immediately, and certain events, such as kicks may be determined reliably. The shoe may, for example, be a soccer, rugby or football shoe.

The sensor assembly may be adapted to be attached to a shin guard. With such an arrangement, certain events, such as kicks, may be determined reliably, while the sensor assembly is independent of shoes worn by the person.

Furthermore, the sensor assembly may be attached to or integrated in a shoe or article of apparel worn by the person, or directly coupled to the person, for example, to his/her skin. For example, the sensor may be placed on the shoe, within the shoe (in an upper, midsole, outsole), or in a sockliner of the shoe (in an insole, which may be removable). The shoe may comprise a cavity into which the sensor assembly is placed. The sensor assembly may also be attached to or integrated into a wearable device like a watch, a bracelet, or a watch-like device, which is able to show the current time. The sensor assembly may be worn at a lower leg area, such as a shin area or an ankle.

The sensor assembly also may be integrated in sports equipment, which the person uses for performing the activity of interest, for example, in a tennis racket, soccer ball, basketball or skateboard.

The system may comprise a wearable device comprising the sensor assembly and the memory. Wearable devices allow for an iconic look and may be worn in an urban context too.

The system may further comprise a wireless module associated with the sensor assembly. The wireless module may be a RFID, NFC, BT, BTLE, Wifi or WLAN module. For example, the sensor assembly, the memory, and the wireless module may be attached to or integrated in a wearable device, and the wireless module may be used to sense other wearable devices nearby. Furthermore, sports relevant areas, such as football grounds or stadiums, may be equipped with wireless beacons or RFID/NFC tags and be recognized by the wearable device. In response, the wearable device may perform an action such as synchronizing the sensor assembly with a camera that is installed in the football ground or stadium.

Synchronizing the sensor data with the video may comprise receiving a wireless signal from the wireless module. For example, when the person wearing the wearable device enters a sports ground, a corresponding wireless receiver module installed at the sports ground receives the wireless signal from the wireless module contained in the wearable device and synchronizes the camera with the sensor assembly. The wireless signal may comprise a timestamp of a real time clock (RTC) contained in the sensor assembly or wearable device. This timestamp enables the camera to synchronize with the RTC of the sensor assembly or wearable device, for example, by adjusting its RTC to the received timestamp. The runtime and/or processing time of the timestamp may be considered and added to the timestamp in order to obtain a more accurate synchronization. The sensor assembly or the wearable device also stores the actual time of two sample points of the recorded video (for example, the first and last frame). If an event is detected in the sensor data, the corresponding time point may be determined based on the stored actual times of the two sample points.

Alternatively, a wireless signal with a timestamp from the RTC of the camera or of the system to which the camera is connected, is transmitted to the wearable device via RFID, NFC, Bluetooth (BT), Bluetooth Low Energy (BTLE), or WLAN, for example. This signal enables the sensor assembly or wearable device to synchronize with the camera, for example, by adjusting its RTC to the timestamp. The runtime and/or processing time of the time stamp may be considered and added to the timestamp in order to obtain a more accurate synchronization.

The sensor assembly may comprise a memory. The sensor assembly and the memory may be contained in a common housing. Thus, a compact device is obtained, which may be attached easily to clothing, a strap, or a shoe, for example.

A still further aspect of the present invention relates to a computer program comprising a plurality of instructions that cause a computer to perform the method as described before, when the instructions are executed.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of a method and a system, according to the invention, are explained with reference to the schematic illustration of FIG. 1. The method according to the invention comprises recording a video of an activity of a person. As shown in FIG. 1, the video may be recorded with a camera 11. The camera 11 may be the camera of a smartphone, a tablet PC, a webcam, a video camera, an action camera, or a camera dedicated for recording sports activities. In general, any camera which is able to record a sequence of frames is suitable. The camera 11 may be fixed at a location, such as a stadium or a sports ground. Alternatively, the camera 11 may be part of a temporary installation or may be held by a person. In any case, the camera 11 is arranged so as to record the activity of the person.

Figure 2:
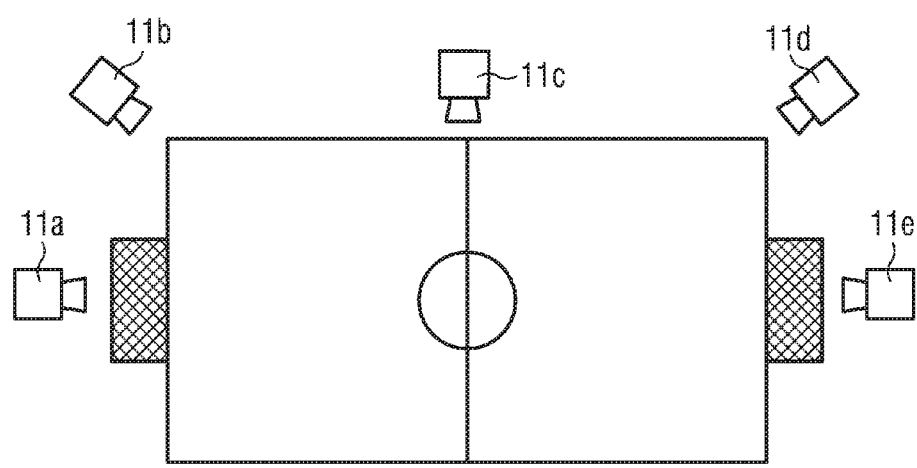
FIG. 2 shows a schematic illustration of the usage of multiple cameras, according to some embodiments of the present invention.

Instead of a single camera 11, multiple cameras may be used, which capture the scene from different angles, as illustrated in FIG. 2. In FIG. 2, five cameras 11a, 11b, 11c, 11d and 11e are arranged around a playing field, which in FIG. 2, is a soccer field, but may be any place that is suitable to perform a sports activity, such as a basketball court, a tennis court, or a street. In FIG. 2, cameras 11a and 11e are positioned behind goals. Therefore, these cameras are especially suitable to capture shots on the goal and actions of a goal keeper. Cameras 11b and 11d are positioned near corner flags and deliver a diagonal view of the playing field. Furthermore, cameras 11b and 11d may capture corner shots very well. Camera 11c is positioned on a projection of a center line. Therefore, camera 11c captures activities in the middle of the field, such as kickoff.

Each of the cameras captures its own video stream, so, in FIG. 2, five video streams are generated. The video streams may be stored either at the respective camera or may be transferred to a central storage unit for later processing, as will be described below. Transfer of the video streams may be via either a wired connection (a video cable) or wirelessly (via WLAN, Bluetooth, etc.).

In general, the number and position of cameras may be different from FIG. 2, and may depend on the sport activity. For example, a golf course may be equipped with a much higher number of cameras. In any case, multiple cameras help to capture the scene from different angles and may also capture activities that may be hidden by foreground players if only a single camera is used. Nevertheless, the present invention may be practiced with only a single camera.

The activity may be a sports activity, such as a soccer, basketball or tennis match. In general, the present invention is applicable to any kind of sports. Furthermore, the present invention may be used in training situations, in a match, or in spare time activities.

The method comprises storing a time-series of a plurality of sensor data obtained from a sensor assembly 12 comprising at least one sensor coupled to the person while the person is performing the activity. As shown in FIG. 1, the person is wearing a sensor assembly 12 at his ankle. The sensor assembly 12 may comprise a single sensor such as an accelerometer, a gyroscope, or a magnetic field sensor, or may comprise multiple sensors, such as a combination of the aforementioned sensors. In general, the at least one sensor is capable of measuring movement of the person because the sensor is sensitive to changes in a kinematical state of a body, or parts of the body of the person. These changes may be changes in movement, such as an acceleration or deceleration, or changes in orientation, such as a rotation. The sensor generates an electrical signal, which corresponds to the changes in the kinematical state. In general, a voltage, a current, or both is/are varied according to the movements.

The at least one sensor of the sensor assembly 12 may be sensitive in several dimensions. For example, an accelerometer may be sensitive in all three spatial dimensions (axes). A gyroscope may be sensitive to rotations around three spatial dimensions (axes). A magnetometer may sense deviations of a magnetic field (the earth's magnetic field). These deviations may be used to determine orientation and rotation relative to the magnetic field, similar to a compass.

The electrical signal emitted by the at least one sensor may be sampled by an analog-to-digital (AD-) converter at a certain sampling rate, for example, between 100 and 10000 Hz, at about 1000 Hz in some embodiments. The electrical signal is represented by a series of discrete values. For example, if the resolution of the AD-converter is 10 bits, the electrical signal at each sampling point is represented by $2^{10}=1024$ possible values. In this way, a time-series of sensor data of the at least one sensor of the sensor assembly 12 coupled to the person is obtained.

In the embodiments of FIG. 1, the sensor assembly 12 is coupled to the ankle of the person. However, the sensor assembly 12 may be coupled to different parts of the body, such as the wrist, chest, head, or shin. Furthermore, the sensor assembly 12 may be attached to or integrated in a shoe, an article of apparel, or a wearable device worn by the person, or may be directly coupled to the person, for example, to his/her skin. For example, the sensor assembly 12 may be placed on a shoe, within a shoe (in an upper, midsole, outsole), in a sockliner of the shoe (in an insole, which may be removable). The shoe may comprise a cavity into which the sensor assembly 12 is placed. The sensor assembly 12 may also be attached to or integrated into a device, such as a wearable device like a strap, watch, bracelet, or watch-like device. The sensor assembly 12 may be worn at a lower leg area, such as a shin area or an ankle.

The sensor assembly 12 may also be integrated in sports equipment, which the person uses for performing the activity of interest, such as in a tennis racket, soccer ball, basketball, or skateboard.

If the at least one sensor is sensitive to movements, rotations, and/or orientation in one dimension (or axis), the time-series is an ordered sequence of single sensor data values observed at consecutive sampling points in time. If the at least one sensor is sensitive to movements, rotations, and/or orientations in more than one dimension (or axes), or if more than one sensor is used, the time-series is an ordered sequence of sensor data vectors observed at consecutive sampling points in time.

The sensor assembly 12 may be or may comprise a satellite navigation system module capable of providing data that corresponds to the location of the person. The satellite navigation system module may be based on GPS, Galileo, Glonass or a combination thereof. The geolocation may be updated, only if the person presses a button, or at predefined time intervals (for example, every 60 seconds, 5 minutes, 10 minutes) to save battery power. The person may set the time interval, for example, via a switch, button or touch-sensitive display on the sensor assembly 12, or via a smartphone, tablet PC, or computer. In the latter case, the time interval may be transmitted to the sensor assembly 12 via a wired connection (such as USB, Ethernet, Thunderbolt) or a wireless connection (such as Wifi, WLAN, BT, BTLE, NFC, RFID, ANT®, ANT+, ZigBee®). Alternatively, the satellite navigation system module is arranged separately from the sensor module 12, such as in a smartphone or a wrist watch worn by the person, and the geolocation may be transmitted to the sensor assembly 12 via a wired connection (such as a thin cable) or a wireless connection (such as Wifi, WLAN, BT, BTLE, NFC, RFID, ANT®, ANT+, ZigBee®).

As shown in the embodiments of FIG. 1, the time-series is stored in a memory 13, such as a hard drive, a solid state drive, or a flash memory, for later processing. For example, the time-series may be retrieved after the activity has finished by reading the stored time-series of sensor data from the memory 13. Reading may be performed wirelessly, for example, via Wifi, WLAN, Bluetooth (BT), Bluetooth Low Energy (BTLE), ANT®, ANT+, or ZigBee®, or via a wired connection, such as via USB, lightning adapter, or RJ-45.

The sensor data may be transmitted from the at least one sensor to the memory 13 wirelessly (for example, via Wifi, WLAN, Bluetooth (BT), Bluetooth Low Energy (BTLE), ANT®, ANT+, ZigBee®) or via a wired electrical connection (for example, via USB, lightning adapter, RJ-45). While the memory 13 is arranged in the embodiments of FIG. 1 at the leg of the person, it is also possible that the memory 13 is not connected in any way to the person, but is arranged separately, for example, in a dedicated housing. In this case, the sensor data is transmitted from the at least one sensor to the memory 13 via a wireless connection.

The memory 13 may be attached to or integrated together with the sensor assembly 12 in a shoe, an article of apparel, or a wearable device worn by the person. For example, the memory may be placed on a shoe, within a shoe (in an upper, midsole, outsole), in a sockliner of the shoe (in an insole, which may be removable). The shoe may comprise a cavity into which the memory 13 is placed. The memory 13 also may be attached to or integrated together with the sensor assembly 12 in a device such as a wearable device like a strap or watch, a bracelet, or a watch-like device. The memory 13 may be worn at a lower leg area, such as a shin area or an ankle. The memory 13 may also be integrated in sports equipment, which the person uses for performing the activity of interest, for example, in a tennis racket, soccer ball, basketball, or skateboard.

Figure 3:
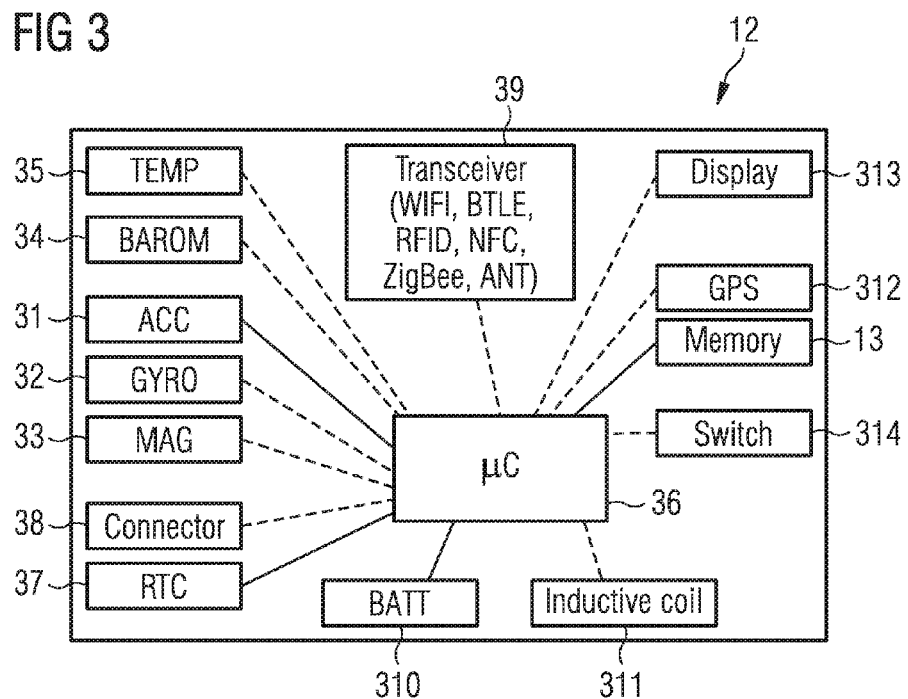
FIG. 3 shows a schematic illustration of a sensor assembly, according to certain embodiments of the present invention.

As is shown in the embodiments of FIG. 3, the memory 13 may be arranged in the sensor assembly 12 and, thus, is part of the sensor assembly 12. FIG. 3 shows a schematic illustration of a sensor assembly 12 and its components, some of which are optional. The sensor assembly 12 comprises at least one sensor. As shown in FIG. 3, this sensor may be an accelerometer 31. An accelerometer measures acceleration and deceleration and outputs corresponding electrical signals. The sensor assembly 12 may comprise more than one accelerometer. In that case, the sensor data from the accelerometers may be combined in a single time-series.

Instead of an accelerometer 31, the sensor assembly may comprise a gyroscope 32. A gyroscope measures changes in the orientation (rotations) and outputs corresponding electrical signals. The sensor assembly 12 may comprise more than one gyroscope. In that case, the sensor data from each of the gyroscopes may be combined in a single time-series. It is also possible that the sensor assembly 12 comprises two or more sensors of a different type, for example, the accelerometer 31 and the gyroscope 32. In this case, the sensor data of both sensors 31 and 32 may be combined into a single time-series.

The sensor assembly 12 may comprise, additionally, or alternatively to the accelerometer 31 and/or the gyroscope 32, a magnetometer 33. A magnetometer measures deviations of a magnetic field (the earth's magnetic field). These deviations may be used to determine the orientation and rotation relative to the magnetic field, similar to a compass. The magnetometer 33 outputs electrical signals corresponding to the orientations.

The sensor assembly 12 optionally may comprise a barometer 34, which measures air pressure and outputs a corresponding electrical signal. The barometer 34 may be used to determine the altitude. The altitude may be stored in the memory 13 together with the data from the other sensors 31, 32, 33, and provided as further statistical information to the person, as will be described below. Alternatively, or additionally, if the sensor assembly 12 comprises additionally a satellite navigation module, as will be described below, data from the barometer 34 may be used to improve the accuracy of geolocation data obtained from the satellite navigation module.

The sensor assembly 12 optionally may comprise a temperature sensor 35, which measures the temperature and outputs a corresponding electrical signal. The measured temperature may be used to improve the accuracy of the barometer 34, as the temperature may influence the barometer readings. Alternatively, or additionally, the measured temperature may be provided as further statistical information to the person, as will be described below.

Data from the at least on sensor 31, 32, 33, 34, 35 is provided to a central processing unit 36, which may be a microprocessor, microcontroller, application-specific integrated circuit (ASIC), field-programmable gate array (FPGA) or similar unit with processing capabilities. The central processing unit 36 may comprise an analog-to-digital converter (ADC), which converts the electrical signals obtained from the sensors 31, 32, 33, 34, 35 to digital signals, which may be processed on the central processing unit 36 by corresponding software or programmable logic blocks (in case of an FPGA). Alternatively, the ADC may be provided in the sensor assembly 12 as a separate component.

As mentioned before, in FIG. 3, the sensor assembly 12 also comprises the memory 13. However, the memory 13 may not be part of the sensor assembly 12, but instead may be a separate component that is connected to the sensor assembly 12 wirelessly (for example, via Wifi, WLAN, Bluetooth (BT), Bluetooth Low Energy (BTLE), ANT®, ANT+, ZigBee®) or via an electrical wire (for example, via USB, lightning adapter, RJ-45).

The memory 13 is coupled to the central processing unit shown in FIG. 3. Thus, the central processing unit 36 may store the data received from the sensors 31, 32, 33, 34, 35 in the memory 13. Optionally, the central processing unit 36 may process the sensor data before storing the sensor data in the memory 13. For example, the central processing unit 36 may perform a preprocessing and filter high frequency components from the sensor data, which are due to noise, or filter low frequency components from the sensor data, which are due to a certain bias of the sensors 31, 32, 33, 34, 35. The central processing unit 36 also may combine the data from two or more sensors 31, 32, 33, 34, 35 into a single time-series and store the time-series in the memory 13.

The central processing unit 36 may provide the received sensor data with a time stamp. To this end, the sensor assembly 12 may comprise a real time clock (RTC) 37, which is connected to the central processing unit 36. The real time clock 37 generates a timing signal, which corresponds to actual time. The real time clock 37 also may be used to synchronize the sensor assembly 12 (and thus the time-series stored in the memory 13) with the camera 11 or cameras 11a, 11b, 11c, 11d, 11e, as will be described below.

The sensor assembly 12 optionally may comprise a connector 38. The connector 38 may be used to connect the sensor assembly 12 to a computer, a tablet PC, or a smartphone, to transfer the sensor data stored in the memory 13 for processing, according to the present invention. The connector 38 may be a USB, lightning or a RJ-45 plug, for example. The connector 38 also may be used to charge the sensor assembly 12 with electrical power.

The sensor assembly 12 may comprise a wireless transceiver 39, which may be used to transmit the sensor data stored in the memory 13 to a computer, a tablet PC, or a smartphone. Alternatively, or additionally, the wireless transceiver 39 may be used to synchronize the sensor assembly 12 with the camera 11 or cameras 11a, 11b, 11c, 11d, 11e, as will be described below. The wireless transceiver 39 may be a Wifi, a WLAN, a Bluetooth (BT), a Bluetooth Low Energy (BTLE), an ANT®, an ANT+, or a ZigBee® transceiver.

Furthermore, the wireless transceiver 39 may be used to sense similar devices around. Certain areas (such as "soccer hotspots", a stadium, football or soccer pitch, etc.) may be equipped with RFID/NFC tags or Bluetooth beacons, and be recognized by the sensor assembly 12. Thus, an identifier associated with the area may be stored by the sensor assembly 12 together with the sensor data from the accelerometer 31, the gyroscope 32, and/or the magnetometer 33 to associate the measured data with the area, or simply to register that the person wearing the sensor assembly 12 has visited a certain location, such as a stadium or store. Instead of a transceiver 39, the sensor assembly 12 may be equipped with a transmitter and/or a receiver as separate components.

The sensor assembly 12 may comprise a battery 310, which provides electrical power to the electronic components of the sensor assembly, such as the sensors 31, 32, 33, 34, 35, the real time clock 37, the transceiver 39, and further optional components, which will be described below. The battery 310 may be an exchangeable battery, a rechargeable battery, which may be exchangeable or permanently fixed in the sensor assembly 12, or a capacitor. In the case of a rechargeable power source (a rechargeable battery or a capacitor), the battery 310 may be charged via the connector 38. Alternatively, or additionally, the sensor assembly 12 may comprise an inductive coil 311, which provides a charging current to the battery 310. To this end, the sensor assembly 12 may be placed near a corresponding transmitter coil, which transfers energy to the inductive coil 311 via a time varying electromagnetic field.

As mentioned above, the sensor assembly 12 may comprise a satellite navigation module 312. The satellite navigation module 312 receives electromagnetic signals from satellites in the earth's orbit and may deduce the location of the sensor assembly 12 on the earth's surface (its geolocation) from these signals. Additionally, the satellite navigation module 312 may deduce an altitude of the sensor assembly 12. The satellite navigation module 312 may be based on the Global Positioning System (GPS), the Glonass system, the European Galileo system, or a combination of these systems.

The sensor assembly 12 optionally may comprise a display 313. The display 313 may indicate information to the person, such as remaining battery power, time, remaining storage capacity in the memory 13, and the status "on/off". The display also may provide feedback to the person based on the sensor data obtained from the sensors 31, 32, 33, 34, 35, as will be described in more detail below.

The sensor assembly 12 optionally may comprise a switch 314. The switch may be a push-button, which after being pushed returns to its previous state. Alternatively, the switch may be a slide switch, which may slide between at least two positions. The switch 314 may, for example, be used to activate the sensor assembly 12, or to manipulate certain settings of the sensor assembly 12. For example, the person may set the current time or set a certain mode of operation. Another use for the switch 314 is updating the geolocation of the sensor assembly 314 using the satellite navigation system module 312, if the person activates the switch 314.

The method according to the invention comprises synchronizing the video with the sensor data. Synchronizing may be performed by associating a data point in the time-series (a window) with a corresponding frame in the video. For example, the data point and the corresponding frame may be associated with the same time stamp. To this end, a wireless signal may be transmitted by the transceiver 39 in the sensor assembly 12, for example, via RFID, NFC, Bluetooth (BT), Bluetooth Low Energy (BTLE), or WLAN. For example, when the person enters a sports ground, a corresponding receiver module installed at the sports ground (in a mat or gate) receives the wireless signal from the transceiver 39 and synchronizes the camera 11 or the cameras 11a, 11b, 11c, 11d and 11e with the sensor assembly 12.

The wireless signal may comprise a timestamp of a real time clock (RTC) 37 contained in the sensor assembly 12. This timestamp enables the camera 11 or the cameras 11a, 11b, 11c, 11d and 11e to synchronize with the RTC 37 of the sensor assembly 12, for example, by adjusting its own RTC to the received timestamp. Runtime and/or processing time of the timestamp may be considered and added to the timestamp to obtain a more accurate synchronization. The sensor assembly 12 also may store the actual time of two sample points of the recorded video (for example, a first frame and a last frame). If an event is detected in the sensor data, a corresponding time point may be determined based on the stored times of the two sample points.

Alternatively, a wireless signal with a timestamp from the RTC of the camera 11, the cameras 11a, 11b, 11c, 11d and 11e, or of a system to which the camera 11 or cameras 11a, 11b, 11c, 11d and 11e are connected, is transmitted to the sensor assembly 12 via RFID, NFC, Bluetooth (BT), Bluetooth Low Energy (BTLE), or WLAN. The wireless signal may, for example, be transmitted by a gate or a mat installed at a stadium or a sports ground. The wireless signal may be received by the transceiver 39 and processed by the central processing unit 36. This signal enables the sensor assembly 12 to synchronize with the camera 11 or cameras 11a, 11b, 11c, 11d and 11e, by adjusting its RTC 37 to the timestamp. Runtime and/or processing time of the time stamp may be considered and added to the timestamp to obtain a more accurate synchronization.

Alternatively, the sensor assembly 12 and the camera 11 or cameras 11a, 11b, 11c, 11d and 11e may be synchronized by determining a synchronization event in the time-series and the synchronization event in at least one frame in the video. For example, a player wearing the sensor assembly 12 may perform a certain predetermined movement, such as clapping his shoes or clapping the sensor assembly 12. The movement may be detected rather easily in the video and in the time-series of the sensor data, as it produces high peaks in the sensor data. Detected data points in the time-series and detected frames in the video may then obtain the same time-stamp to synchronize the video with the time-series.

The method comprises detecting an event in the time-series. An event is defined as a part of a human activity that has a short and restricted duration. For example, the event may be a soccer shot or pass, a hit of a tennis ball, or a golf swing. The event may be detected in the time-series by suitable methods, as will be described below.

The method also comprises associating the event with at least one corresponding frame in the video showing the event. Based on the synchronization of the sensor data and the video, the frames corresponding to a detected event may be identified in the video.

Generally, the recorded video and the sensor data stored in the memory 13 may be transferred to a device 14, which is suitable to perform the relevant method steps, such as the detection of events and associating detected events with corresponding video frames. The device 14 may be a smartphone, a table, a PC, a server, or a dedicated computing device. The video may be transferred to the device 14 wirelessly, such as via WLAN, Bluetooth or Bluetooth Low Energy, or via a wired connection, such as via USB, Firewire, or Thunderbolt. The video and/or the sensor data may be transmitted to the device 14 during the activity, via wireless connections, or after the activity has finished. In the latter case, wired connections (such as USB) may be used instead of wireless connections.

The device 14 may comprise a processor 15, which is able to synchronize the video with the sensor data, detect an event in the time-series, and associate the event with at least one corresponding frame in the video showing the event. To this end, computer executable instructions may be loaded into the processor 15, from a memory 16 (such as a hard drive, a solid state drive, or a flash memory) and cause the processor 15 to perform the relevant method steps. The memory 16 may also be used to store the video and/or the sensor data for later processing by the processor 15, according to the described method.

Figure 4:
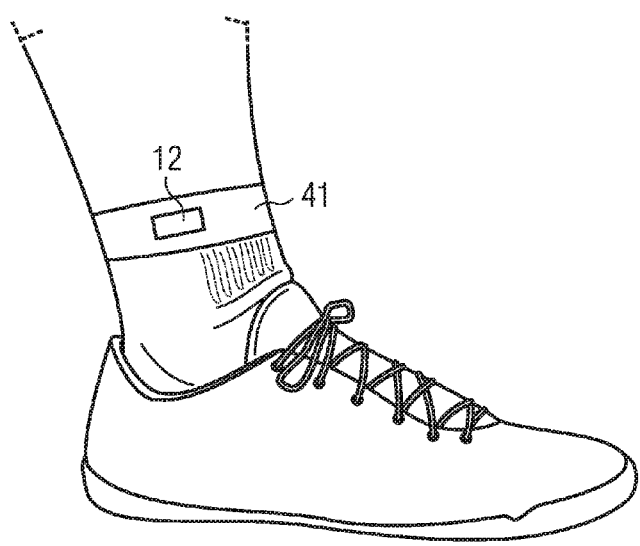
FIG. 4 shows embodiments of a sensor assembly attached to a strap.

FIG. 4 shows some embodiments of a wearable device 41, in the form of a strap 41 comprising a sensor assembly 12. The sensor assembly 12 may be a sensor assembly 12, as described with reference to FIG. 3. For example, the sensor assembly 12 may also contain the memory 13 for storing the sensor data. The sensor assembly 12 may be removably attached to the strap 41, for example, by a hook-and-loop fastener, a snap button, or a magnetic fastener. Alternatively, the sensor assembly 12 may be permanently attached to the strap 14, for example, by gluing, welding or stitching. The strap 41 has the benefit of being independent of footwear, so that the strap may be used without shoes (for example, on sand or on a lawn).

The strap 41 may be made from textile material, leather, artificial leather, or plastics. A strap is understood as any loop-like arrangement, which is capable of being worn at an extremity of a person's body, such as an arm and/or a leg. Thus, the strap 41 may be worn at a leg, for example, near the ankle. Accuracy of the method of the invention may be improved if a strap with a further sensor assembly 12 is worn at another leg. This may, in particular, be beneficial for a soccer application, because soccer players usually handle the ball with both feet. The sensor data from both sensor assemblies 12 may be combined into a single time-series. To this end, one sensor assembly 12 may transmit its sensor data to the other sensor assembly 12, for example, wirelessly, by using the transceiver module 39. The sensor data may be combined by the central processing unit 36 in the receiving sensor assembly 12. Alternatively, both sensor assemblies transmit the sensor data to the device 14 via the wireless transceiver module 39 or the connector 38, as described above. The sensor data from both sensor assemblies 12 may be combined in the device 14.

It may be beneficial for a player to wear more than one sensor assembly 12 during other sports activities as well. For example a tennis player may wear a first sensor assembly 12 on his arm, for example, at the wrist, and a second sensor assembly 12 on one of his legs, for example, near the ankle. The first sensor assembly 12 may record sensor data, which is representative for his arm movements and ball hits, whereas the second sensor assembly 12 records sensor data, which is representative for his movements on the tennis court. The sensor data from both sensor assemblies 12 may be combined as described above. Thus, the sensor data recorded by both sensor assemblies represents a more complete recording of the player's tennis activity.

As already mentioned, the sensor assembly 12 may be equipped with a satellite navigation module 312 to track the location of the person or to measure data which is relevant for detecting certain events. Thus, waypoints may be used with the present invention or may be stored by the memory 13 together with the data from the accelerometer, and/or the gyroscope and/or the magnetometer to associate the data with a geolocation. The usage of waypoints may depend on the person activating the switch 314, as described above.

The method may comprise using the at least one corresponding frame to generate a second video, a highlight video, showing the events of the activity of the person. All frames associated with corresponding detected events may thus be compiled into the highlight video. The highlight video provides feedback or a summary to the player and may be considered as a "highlight reel" or "show reel" of his performance.

"Highlight reel" or "show reel" in the context of the present invention is understood as a collection of video sequences, which share a common property. One common property may, for example, be that all video sequences of the highlight reel show kicks and/or passes and/or tricks of a certain player. Another highlight reel may show all defensive events of a goal keeper. Furthermore, a highlight reel may show specific tricks that a player made, for example, keepy-uppy or around-the-world. The common property does not necessarily relate to a certain player. The highlight reel also may show all shots made in a match above a certain ball speed (for example, 50, 60, 80, 100 km/h) independent of the player.

The highlight video may be generated on the device 14 and may be uploaded to servers on the internet or directly to consumer devices such as smartphones, tablet computers, PCs, and smart watches.

FIG. 5 shows some embodiments of how the video may be transferred from the device 14 to consumer devices 51*a*, 51*b*, 51*c*, 51*d*. First, the video and/or additional summary statistics may be transferred from the device 14 to a cloud 52. Accordingly, the device 14 is also connected to the Internet, via a wired connection (such as via Ethernet, USB, Thunderbolt) or a wireless connection (such as via Wifi, WLAN, BT). The cloud 52 may be implemented by a single server or a server farm connected to the Internet. "Cloud" in the context of the present invention is understood as any server, which is capable of storing the video and/or summary statistics and providing the same to consumer devices.

The video and/or summary statistics may be accessed on the cloud 52 by the devices 51*a*, 51*b*, 51*c*, 51*d*. For example, devices 51*a* and 51*b* are mobile devices such as smartphones, tablet PCs, and smart watches. The devices 51*a* and 51*b* are connected to the Internet via a wireless connection such as 3G, 4G, UMTS, LTE, Wifi, WLAN, BT, BTLE. For downloading and presenting the video and/or summary statistics from the cloud 52, an application (often denoted as "app" in the context of mobile devices) may be installed on the mobile devices 51*a* and 51*b*. Such apps may be downloaded from a virtual store (such as Apple iTunes google Play®). The app connects to the cloud 52 and downloads the video and/or summary statistics from the cloud 52. Alternatively, the video and/or summary statistics may be streamed from the cloud 52 to the mobile device without downloading (without storing the video on the mobile device). Then, the video and/or summary statistics may be presented to the person as will be described in more detail below.

Instead of an app, an Internet browser installed on the mobile devices 51*a*, 51*b* may be used as well for connecting to the cloud 52. To this end, the person directs the browser to a certain web page and enters a username and password. After the person has been granted access, the person may either directly view the video and/or summary statistics in the browser or download the video and/or summary statistics for later viewing.

The video and/or summary statistics also may be accessed from a desktop PC 51*c* and/or a notebook 51*d*. To this end, a software application for accessing the cloud 52 and for downloading and presenting the video and/or summary statistics may be installed on the desktop PC 51*c* and/or notebook 51*d*. Alternatively, the video may be streamed from the cloud 52 to the device without downloading (without storing the video on the device). The desktop PC 51*c* and the notebook 51*d* may be connected to the Internet via a wireless connection such as 3G, UMTS, LTE, Wifi, WLAN, BT, or a wired connection such as Ethernet, USB, Thunderbolt.

Instead of a software application, an Internet browser installed on the desktop PC 51*c* and/or notebook 51*d* may be used as well for connecting to the cloud 52. To this end, the person directs the browser to a certain web page and e.g. enters a username and password. After the person has been granted access, he may either directly view the video and/or summary statistics in the browser or he may download the video and/or summary statistics for later viewing.

As an alternative to the embodiments of FIG. 5, the devices 51*a*, 51*b*, 51*c* and 51*d* may directly connect to the device 14 to download the video and/or the summary statistics. The connection may be established via a wireless connection such as Wifi, WLAN, BT, BTLE, or a wired connection such as Ethernet, USB, Thunderbolt. For example, the device 14 may be installed at a stadium or sports ground. After the person wearing the sensor assembly 12 has performed a sports activity, the sensor data stored in the memory 13 is transferred to the device 14 as described above and processed on the device 14 to produce a summary video (a "highlight reel" or "show reel") and optionally produce additional summary statistics. Then, the person may use his smartphone, tablet PC, or smartwatch to connect to the device 14 to download the video and optionally the summary statistics. Alternatively, the video is streamed from the device 14 to the devices 51*a*, 51*b*, 51*c* and 51*d* without downloading (without storing the video on the devices 51*a*, 51*b*, 51*c* and 51*d*).

The video and/or summary statistics also may be shared on social media platforms (such as youtube, Instagram, vine, twitter, facebook). For example, the cloud 52 may be part of such a social media platform. Alternatively, the video and/or summary statistics is transferred from the device 14 or from the cloud 52 to a server of a social media platform. For example, once a summary video and/or summary statistics has been generated on the device 14, the video and/or summary statistics is automatically added to a person's social media profile. Other persons to which the person is connected via the social media platform may then have access to the video and/or summary statistics and may post comments or share the video and/or summary statistics with other persons.

FIG. 6 illustrates how the video and/or summary statistics may be presented to a person using a mobile device 51*a*, 51*b* (such as a smartphone, tablet PC, smartwatch, etc.), a desktop PC 51*c*, notebook 51*d*, or in general any device comprising a display 61. The video is presented to the person on a display 61 of the device 51*a*, 51*b*, 51*c*, 51*d*. The person may have several possibilities to influence how the video is presented. For example, on the top of the display 61, just above the video, a scene selection bar 62 is shown. The person may switch between different scenes of the video, which correspond to different events which the person performed during the activity. For example, the first scene may show the person performing a kickoff. The second, third and fourth scenes may show the person making passes. The fifth and sixths scene may show the person performing shots to the goal, and so on. The person may select each of these scenes by tapping or clicking one of the corresponding buttons in the scene selection bar 62. The number of scenes may differ from the example shown in FIG. 6. Also, the scene selection bar 62 may be positioned differently, for example on a bottom of the display 61 or on a side. Furthermore, the display 61 may show no scene selection bar 62 at all.

Below the scene selection bar 62 is a time slider 63. This slider 63 runs along a predefined path, wherein a beginning of the path corresponds to a beginning of the video and an end of the path corresponds to an end of the video. Thus, in FIG. 6, the path begins at 0 seconds and ends at 1 minute and 10 seconds. The position of the slider 63 on the path corresponds to the current position of the video. For example, if the slider 63 reaches the middle of the path, half of the video is over and the other half is about to start. The person may tap or click and hold the slider 63 to slide it to an arbitrary point between the beginning and the end of the video to show the video from the respective point in time. The position of the slider 63 may be different, for example on the bottom of the display 61 or on the sides. Furthermore, the display 61 may show no slider 63 at all.

At the bottom of display 61 a camera selection bar 64 is shown. The camera selection bar 64 allows the person to select the camera position of the video. Thus, in the embodiments of FIG. 6, the person may select between five different cameras 51*a*, 51*b*, 51*c*, 51*d*, 51*e*, which show the respective scene of his activity from five different angles. The number of cameras may be different and may range from a single camera to dozens of cameras. The person selects the camera by tapping or clicking on the respective button, which is associated with the camera. The position of the camera selection bar 64 may be different, for example on the bottom of the display 61 or on the sides. Furthermore, the display 61 may show no camera selection bar 64 at all.

On the right side of the display, a feedback and statistics area 65 is shown. In this area statistics and feedback are shown, which have been extracted, according to the invention, from the sensor data obtained from at least one sensor 31, 32, 33, 34, 35 of a sensor assembly 12 worn by the person during the activity. Thus, in the embodiments of FIG. 6, the feedback and statistics area 65 shows the speed of a ball during a scene, which shows a shot performed by the person. The middle of the feedback and statistics area 65 shows the name of a trick the person has performed in one scene, such as around-the-world, or juggling with the ball. Furthermore, the feedback and statistics area 65 provides an action counter, which counts, for example, all shots to the goal, all 1-on-1-situations, all dribblings, and all passes. Thus, in the beginning of the video, the counter is at zero and increments with each particular action (event) the person performs in the video. The content of the feedback and statistics area 65 may be different. For example, the content may show only the ball speed or only the performed action (trick, pass, shot), or may show both. Also, the position of the feedback and statistics area 65 may be different, for example on the bottom of the display 61 or on the sides. Furthermore, the display 61 may show no feedback and statistics area 65 at all.

Figure 7:
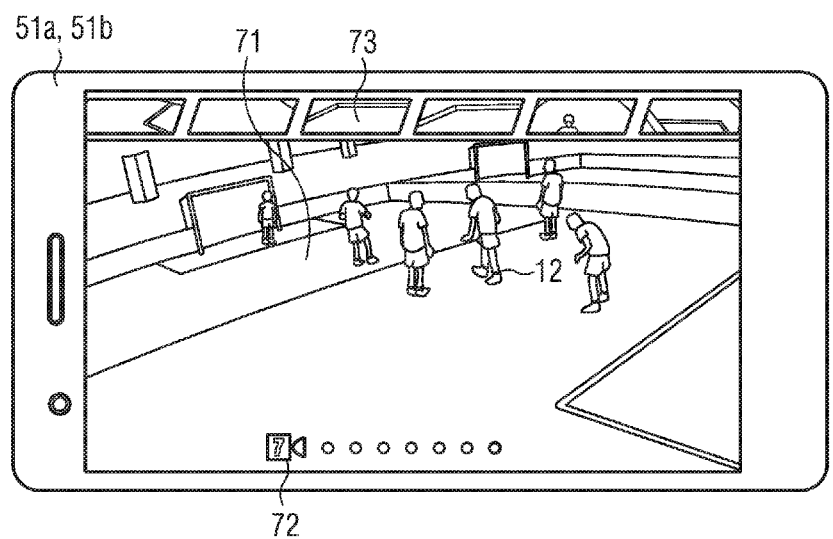
FIG. 7 shows a presentation on a mobile device of a video generated, according to certain embodiments of the invention.

FIG. 7 illustrates how the summary video (or "show reel" or "highlight reel") may, in particular, be presented to a person using a mobile device 51*a*, 51*b*, such as a smartphone or tablet PC. The mobile device 51*a*, 51*b* comprises a display 71 on which the video is shown. In FIG. 7, the summary video is based on videos taken by seven cameras. The cameras are arranged around an indoor soccer field similar to the setup shown in FIG. 2. A different number of cameras may be used as well, such as five, three, two or only a single camera. The main view of the display 71 shows one video of a particular camera in an enlarged view almost filling up the entire screen.

As shown in FIG. 7, each player is wearing at least one sensor assembly 12 near an ankle, one of which has been exemplarily denoted with the reference numeral 12. The sensor assembly 12 stores sensor data while each player is engaged in a match (such as a five-a-side match in the example of FIG. 7), as described in detail in this specification. The sensor data is processed, as described in detail in this specification, to detect certain events such as kicks, passes, shots, dribblings, and 1-on-1-situations. The events are associated with corresponding video frames in the videos taken by the cameras (seven in the example of FIG. 7) to obtain a summary video (or "highlight reel" or "show reel"), as described in detail in this specification. The summary video is presented to a person using a mobile device, as illustrated with reference to FIG. 7.

In FIG. 7, a camera selection area 72 is shown on the bottom of the display 71. The position of the camera selection area 72 may be different, for example, on the top of the display 71 or on the sides. Furthermore, the display 71 may show no camera selection area 72 at all. The camera selection area 72 comprises a pictogram of a camera showing the number of the camera that is actually selected as the main camera (the camera being associated with the enlarged video filling up almost the entire screen). In the example of FIG. 7, this number is seven, but may be any value in the range of one to seven. This range may be different if a different number of cameras had been used. For each camera, a dot is shown in the camera selection area 72. The person may change the main camera either by tapping or clicking on one of the dots or by sliding at least one finger over the display, for example, from left to right, from right to left, from top to bottom, or from bottom to top.

In FIG. 7, a camera overview area 73 is shown on the top of the display 71. The position of the camera overview area 73 may be different, for example, on the top of the display 71 or on the sides. Furthermore, the display 71 may show no camera overview area 73 at all. The camera overview area 73 shows a small scale video of each of the remaining cameras, which are not shown in the enlarged view on the display 73. Thus, in FIG. 7, six small videos are simultaneously shown in the camera overview area 73.

When the person changes the main camera as described above, the video of the previous main camera is shown in the camera overview area 73 instead of on the largest portion of the screen. Instead, the video of the new selected main camera is shown on the largest portion of the screen and removed from the camera overview area. For example, as the person changes the main camera from camera seven to camera six by sliding over the display 71, the video of camera six may be substituted in the camera overview area 73 by the video of camera seven. At the same time, the video of camera seven making up the largest portion of the screen is substituted by the video of camera six.

Additional information may be shown on the display 71 as well, such as feedback and statistics information, as explained with reference to FIG. 6. For example, the speed of a ball may be estimated based on the sensor data obtained from a sensor assembly 12 of one of the players and may be shown as an overlay over the video of the main camera, for example, in km/h or mph, while the videos show the corresponding shot.

The sensor assembly 12 may also be used as a kind of activity tracker. To this end, the sensor assembly 12 may, for example, be attached to a strap (such as the strap 41 shown in FIG. 4) or a bracelet, and may be worn at a wrist or ankle. The sensor data obtained by the at least one sensor 31, 32, 33, 34, 35 in the sensor assembly 12 may be used to count steps, distance, and calories burned. Also, the sensor data may be used to count, for example, soccer related tricks (such as around-the-world, juggling with the ball), which a person wearing the sensor assembly 12 has performed during a day. If the sensor assembly 12 is equipped with a satellite navigation module 312, the sensor assembly 12 may also save a geolocation where the tricks were performed and/or where the person performed other sports activities like running. The gathered activity statistics may be distributed to consumer devices and/or social media platforms, as described with reference to FIG. 5.

Figure 8:
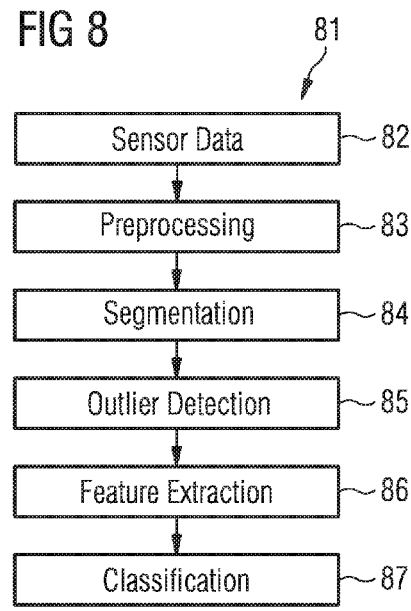
FIG. 8 shows a sequence of steps for detecting an event from a time-series of sensor data, according to some embodiments of the present invention.

FIG. 8 depicts embodiments of a sequence 81 of steps for detecting an event in the time-series of the plurality of sensor data 82. The sensor data 82 is obtained from at least one sensor 31, 32, 33, 34, 35 in a sensor assembly 12, as described with reference to FIG. 3. The sequence of steps comprises preprocessing 83 the time-series, segmenting 84 the time-series into a plurality of windows, detecting 85 outliers, extracting 86 a plurality of features from the time-series in each of the plurality of windows, and detecting 87 an event class associated with the plurality of windows based on the plurality of features extracted from the time-series in each of the plurality of windows. In the following, each of those steps is described in more detail.

The time-series may be written as T=(s [0], s [1], . . . , s [N−1]), where N denotes the number of samples and s [k] the amplitude of the sensor data of one axis at sampling point k.

Figure 9:
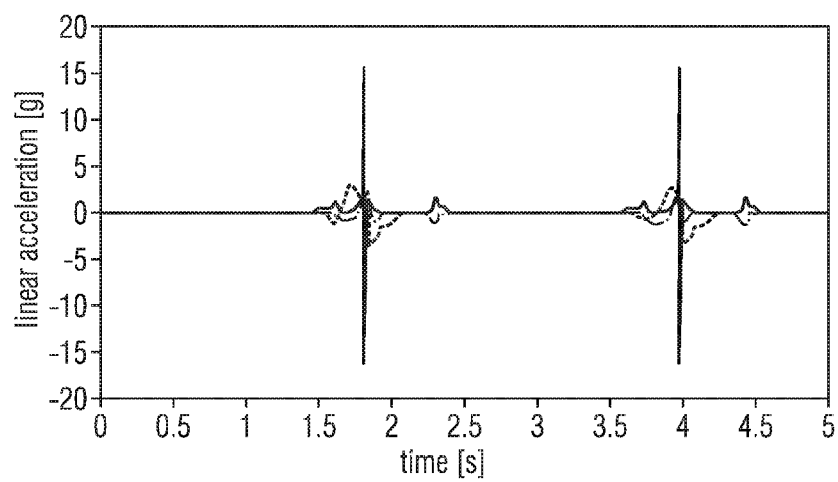
FIG. 9 shows a plot of a time-series obtained from a 3-axis accelerometer.

A time-series obtained from a 3-axis accelerometer is shown in a plot in FIG. 9. In this plot, the abscissa refers to the time in seconds, and the ordinate refers to the acceleration measured in units of the earth's gravitational acceleration g. The plot shows the temporal evolution of the acceleration in all three dimensions (three axes). This exemplary time-series was obtained by an accelerometer placed inside a soccer shoe while the soccer player wearing the shoe was making two subsequent short passes.

In a first sequence step 83, the time-series of the sensor data is preprocessed, for example, by low-pass filtering, downsampling, Butterworth filtering, or generating a moving average. Low-pass filtering removes the high-frequency components from the signal, which are substantially due to noise. Downsampling maps a time-series sampled with high frequency (for example, 10 to 10000 Hz, in some embodiments, 1000 Hz) to a lower frequency time-series (for example, 1 to 1000 Hz, in some embodiments, 100 Hz) by combining adjacent sampling points. Besides removing high-frequency components, preprocessing also reduces computational complexity as fewer data points are to be processed.

For step 84 of segmenting, a signal magnitude vector SMV of the three axes $s_1$, $s_2$, $s_3$ of the accelerometer may be computed according to SMV $[k]=\sqrt{s_1^2[k]+s_2^2[k]+s_3^2[k]}$.

More information about SMV may be found in Shaoyan Zhang, Alex V. Rowlands, Peter Murray, and Tina L. Hurst, "Physical Activity Classification Using the GENEA Wrist-Worn Accelerometer", *Medicine & Science in Sports & Exercise*, 44(4): 742-748, 2012. The signal magnitude vector is used to determine energy rich regions in the signal. Events like short passes are represented by high peaks as may be seen in FIG. 10.

For further processing, only parts of a signal in which SMV exceeds a predefined threshold are processed. This minimizes the number of windows that are processed further. Consecutive samples, for which the amplitudes are above the threshold, are denoted as one signal patch.

Figure 10:
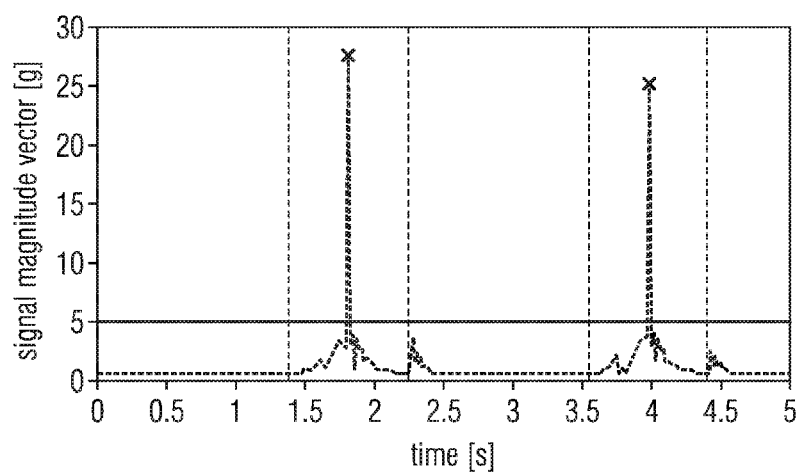
FIG. 10 shows a plot of a signal magnitude vector computed from the 3-axis accelerometer shown in FIG. 9.

For each signal patch, a time point corresponding to the maximum SMV determines a center of a fixed sized window which is used for further processing. FIG. 10 shows two examples of windows.

Finding an optimal window size for all events is challenging, since length of events may differ, for example the length of a shot versus the length of control. Therefore, a novel and intelligent window size determination procedure is proposed, which adapts the window size to a length of the event. The SMV of one signal patch is modelled by a Gaussian curve. The parameters of the Gaussian curve may be used to estimate an optimal window size for each event.

The time-series may also be segmented in step 84 in a plurality of windows by matching the event with a template of an event that is defined using known signals of pre-recorded events. The matching may be based on correlation, Matched Filtering, Dynamic Time Warping, or Longest Common Subsequence (LCS) and its sliding window variant, warping LCS.

The sensor data (acceleration, angular velocity) of the window are the input of an outlier detection step 85. The goal is to remove windows that include instances of undesired actions, such as jogging, running or tackling. The proposed method uses a Rule based system, which rates the plausibility of the parameters of the Gaussian curve, and one-class Support Vector Machines for each desired event. Details of one-class Support Vector Machines may be found in Bernhard Schölkopf, John C. Platt, John Shawe-Taylor, Alex J. Smola and Robert C. Williamson, "Estimating the Support of a High-Dimensional Distribution", *Neural Computation*, 13(7): 1443-1471, 2001.

Another step, as shown in FIG. 8, is feature extraction 86. In this step 86, a plurality of features from the sensor data in each of the windows is extracted. Features (also denoted as characteristic variables) are extracted to represent the particular window in a lower dimension.

The extracted features may, for example, be based on at least one of temporal statistics, spatio-temporal statistics (statistics over time and locations of more than one sensor), spectral, or ensemble statistics by applying, for example, wavelet transform, principal component analysis (PCA), coefficients of a Linear Predictive Coder (LPC), coefficients (e.g. spectral centroid and bandwidth) of a Fast Fourier Transform (FFT). Other features may be used as well.

Features based on temporal statistics are extracted by applying multivariate analysis to a window to obtain a lower dimensional representation of the window. Methods of multivariate analysis are summarized, for example, in Alvin C. Rencher and William F. Christensen, *Methods of multivariate analysis*, 3$^{rd}$ edition, John Wiley & Sons, 2012.

Human motion has limited degrees of freedom analogous to human joints, leading to redundant observations of multiple sensor axes. For example, body axes are related while moving backwards for initiating a kick. A linear relationship between sensor axes (different dimensions of observations) may be measured by a sample correlation. A sample correlation coefficient between two sensor axes may be estimated by the Pearson correlation coefficient.

A sample mean of a window is defined by averaging the data samples in one dimension (the data associated with one sensor axis). Moreover, the signal energy gives evidence of movement intensity. Human events may thus be analyzed by reflecting the intensity: for example, in soccer, the kicking event is presumed to have higher power than other events like short passes or dribbling actions. The signal energy in one observation window in dimension d (sensor axis d) is evaluated by $$E_d = \frac{1}{N}\sum_{k=0}^{N-1} (s_d[k])^2.$$

To capture the overall intensity of human motion, the Movement Intensity, MI, is introduced as accumulation of the normalized energies over all dimensions D:

$$MI = \frac{1}{D}\sum_{d=1}^{D} E_d.$$

In addition, normalized Signal Magnitude Area, SMA, is defined as $$SMA = \frac{1}{ND}\sum_{k=0}^{N-1}\sum_{d=1}^{D}|s_d[k]|,$$

by adding up the absolute values $|s_d[k]|$. Higher-order statistics like kurtosis and skewness may be used as well.

Additionally, or alternatively, spatio-temporal features such as minimum and maximum values along the dimensions of the window may capture information of intense peaks in the signal. Thus, exemplary temporal and spatio-temporal statistics include sample mean, normalized signal energy, movement intensity, signal magnitude area, correlation between axes, maximum value in a window and minimum value in a window.

Additionally, or alternatively to temporal or spatio-temporal statistics, wavelet analysis may be used for feature extraction 86 as well. Wavelet analysis may characterize non-stationary signals, whose spectral statistics change over time. Moreover, wavelet analysis has the property of reflecting transient events as it captures temporal and spectral features of a signal simultaneously. Wavelet analysis is performed using a single prototype function called wavelet, which is equivalent to a band-pass filter. Multi-scaled versions of the wavelet are convolved with the signal to extract its high-/low-frequency components by a contracted/deleted version of the wavelet. Given a window of sensor data observations, multi-resolution analysis in time-frequency domain is performed by dilating the basis wavelet. The wavelet transform offers superior temporal resolution of the high-frequency components and a superior frequency resolution of the low-frequency components. Details of wavelet analysis may be found in Martin Vetterli and Cormac Herley, "Wavelets and filter banks: Theory and design", *IEEE Transactions on Signal Processing*, 40(9): 2207-2232, 1992.

Discrete Wavelet Transform may be used to capture characteristics of human motion. It may be implemented efficiently as fast wavelet transform. It is represented by a filter bank, which decomposes a signal by a series of low-pass and high-pass filters. At each level i, the input signal sin is filtered by a low-pass filter $g_i[k]$ and a high-pass filter $h_i[k]$. In other levels, the low-pass filtered signal is decomposed into lower resolution by down sampling the signal by a factor of two, whereas the high-pass filtered signals serve as detail coefficients $q_i$, which may be used as a feature of the respective window. Thus, the sensor data of the window is represented by detail coefficients $q_i$ which serve as features. The wavelet decomposition also provides approximation coefficients (last decomposition), which also may be used as features. Furthermore, features based on approximation/detail coefficients may be computed, like those mentioned before: signal energy. If the high-pass signal is decomposed equally, the transformation is called Wavelet Packet Decomposition. Details of the Discrete Wavelet Transform to capture characteristics of human motion may be found in Martin Vetterli and Cormac Herley, "Wavelets and filter banks: Theory and design", *IEEE Transactions on Signal Processing*, 40(9): 2207-2232, 1992.

Daubechies wavelets may be used in the context of the present invention, because they may be implemented in such a way that is computationally efficient. For example, a Daubechies wavelet of order seven may be used for feature extraction.

Thus, a plurality of features may be extracted based on temporal, spatio-temporal, spectral, or ensemble statistics by applying Wavelet Analysis, and Principal Component Analysis, for example. Features may include sample mean, normalized signal energy $E_d$, movement intensity (MI), signal magnitude area (SMA), correlation between axes, maximum value in a window, minimum value in a window, and maximum detail coefficient $q_i$ at level 1 obtained by a wavelet transform.

The most relevant and nonredundant features should be selected from a feature set of all extracted features, to reduce the complexity of implementation of the method. Any redundancy between features may result in an unnecessary increase in computational costs. This selection of features should yield a feature subset with the best classification performance. One may choose between different selection techniques, such as wrapper methods, selection filters and embedded approaches.

Wrapper methods evaluate performance of the method using different feature subsets. For example, sequential forward selection may provide the best performing features iteratively.

Selection filters are a fast method to find the most relevant and nonredundant features, as no classifier is involved in the selection procedure. Mutual information may indicate the relevance of feature subsets and may be estimated by different filter techniques.

Embedded selection may be used to avoid the exhaustive search required by wrapper methods and the estimation of probability density functions required by selection filters. Embedded selection is reasonable as some classifiers used in method step 87 already include a rating of importance of the feature.

For example, Random Forest classifiers may be used for feature selection. A Random Forest may be described as an ensemble of decision tree classifiers, which grows by randomly choosing features of the sensor data. For each tree, a subset of sensor data is drawn from the whole set with replacement (bootstrapping). Within this subset, features are chosen randomly, and thresholds are built with values at each splitting node of the decision tree. During classification, each tree decides the most probable class of an observed feature vector, and the outputs of all trees are merged. The class with the most votes is a final output of the classifier (majority voting). Details of Random Forest classifiers may be found in Leo Breiman, "Random forests", *Machine learning*, 45(1): 5-32, 2001.

As shown in FIG. 8, in step 87 of the sequence according to the invention, an event class associated with each of the windows is estimated based on the plurality of features extracted from the sensor data in the respective window. This step is also referred to as classification.

Several classifiers may be used for classification, such as Naïve Bayes, Support Vector Machine and Random Forest, AdaBoost classifier, a Nearest Neighbor classifier, a Neural Network classifier, a Perceptron classifier, a Rule based classifier, or a Tree based classifier.

In the Naïve Bayes approach, a posterior probability density function may be written as $$p(\tilde{y}|\tilde{x}) = \frac{p(\tilde{y})p(\tilde{x}|\tilde{y})}{p(\tilde{x})}$$

applying the Bayesian formula. Instead of maximizing the posterior probability density function, the class conditional probability density function $p(\tilde{x}|\tilde{y})$ may be maximized to estimate the class $\hat{y}$:

$$\hat{y} = \underset{\tilde{y} \in Y}{\operatorname{argmax}} p(\tilde{y} | \tilde{x}) = \underset{\tilde{y} \in Y}{\operatorname{argmax}} p(\tilde{y}) p(\tilde{x} | \tilde{y}).$$

Naïve Bayes classification solves this equation under the assumption that all components of feature vector $\tilde{x}$ are mutually independent. This leads to the simplification:

$$\hat{y} = \underset{\tilde{y} \in Y}{\operatorname{argmax}} p(\tilde{y}) \prod_{f=1}^{vF} p(\tilde{x}_f | \tilde{y}).$$

The class conditional probability density functions, observing feature $\tilde{x}_f$ given the class $\tilde{y}$, are assumed to be Gaussian probability density functions: $p(\tilde{x}_f|\tilde{y}) \sim N(\tilde{x}_f; \mu_f, \sigma_f^2)$. Thus, the probability density functions are only defined by their means $\mu_f$ and variances $\sigma_f^2$.

Given an unlabeled feature vector $\tilde{x}$ in method step 87, the Gaussian distributions $p(\tilde{x}_f|\tilde{y})$ are evaluated for each class $\tilde{y} \in Y$ at each feature value of $\tilde{x}$. Then, the class is estimated by the equation derived above:

$$\hat{y} = \underset{\tilde{y} \in Y}{\operatorname{argmax}} p(\tilde{y}) \prod_{f=1}^{vF} p(\tilde{x}_f | \tilde{y})$$

to obtain $\hat{y}$. In this way, the event class may be estimated in method step 87, based on a Naïve Bayes classifier. An overview of the Naïve Bayes approach for classification may be found in Sergios Theodoridis and Konstantinos Koutroumbas, *Pattern Recognition*, 4th edition, Elsevier, 2008.

Figure 11:
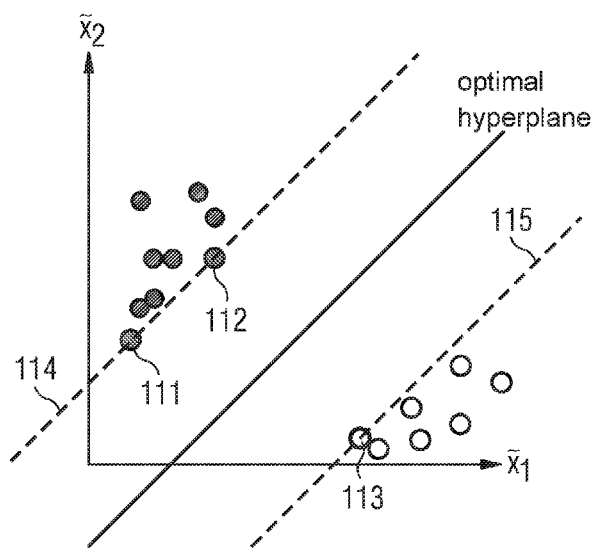
FIG. 11 shows an illustration of a Support Vector Machine.

Another classifier, which may be used in method step 87, is based on a Support Vector Machine (SVM). SVMs focus directly on class boundaries, for example, in the case of linear SVM, SVMs focus on the class boundaries in an original feature space. A feature space is defined as a mapping of feature vectors in a multidimensional system, where each dimension of a feature vector corresponds to one coordinate axis. The concept is to find the largest linear margin between the feature vectors of two classes, as illustrated in FIG. 11. In this case, the two-dimensional feature sets are linearly separable. The feature vectors 111, 112 and 113 lying on the margins 114 and 115 are called support vectors and define an optimal hyper-plane.

Given a training dataset D, the feature vectors of the event are analyzed in the feature space. A maximum margin is found by the SVM, separating the classes with a maximum distance. This distance equals the maximum distance between the convex hulls of the feature sets. Apart from using a linear kernel, other kernel types may be applied, such as a polynomial or RBF (radial basis function). A detailed description may be found in Richard O. Duda, Peter E. Hart and David G. Stork, "Pattern Classification", 2nd edition, John Wiley & Sons, 2000.

Given an unlabeled feature vector $\tilde{x}$ in method step 87, the feature vector is analyzed in the feature space. The distance and the location with respect to the separating hyper-plane give evidence about posterior probabilities. However, the posterior probabilities are not provided directly, as only distances are measured. The sign of the objective function corresponds to the most probable class and is used as estimate $\hat{y}$. When more than one event is to be determined, the distance vectors to several hyper-planes separating the feature space have to be considered.

A further approach, which may be used in method step 87, is based on Random Forests. As mentioned above, a Random Forest involves an ensemble of decision tree classifiers, which are growing by randomly choosing features from a training data.

Given a training dataset D, the trees may be built as described in Trevor Hastie, Robert Tibshirani, Jerome Friedman, "The elements of statistical learning", volume 2, Springer 2009. For every tree, a subset of data is drawn from the training dataset with replacement (bootstrap data). Each tree is grown from the bootstrap data by recursively repeating the following steps until a minimum node size is reached: first, randomly selecting a subset of features. Second, among the subset, picking the feature providing the best splitting between classes to build the threshold at the current node, and omitting the chosen feature for the next iteration. Third, splitting the node into daughter nodes.

Given an unlabeled feature vector $\tilde{x}$ in step 87, the class $\tilde{y}$ is estimated according to the estimated class of all trees. The class with the majority of votes corresponds to the estimate of the Random Forest $\hat{y}$.

The classification of the desired events, for example, short pass (SP), long pass (LP), control (CO) and shot (ST), is performed in a hierarchical manner.

Figure 12:
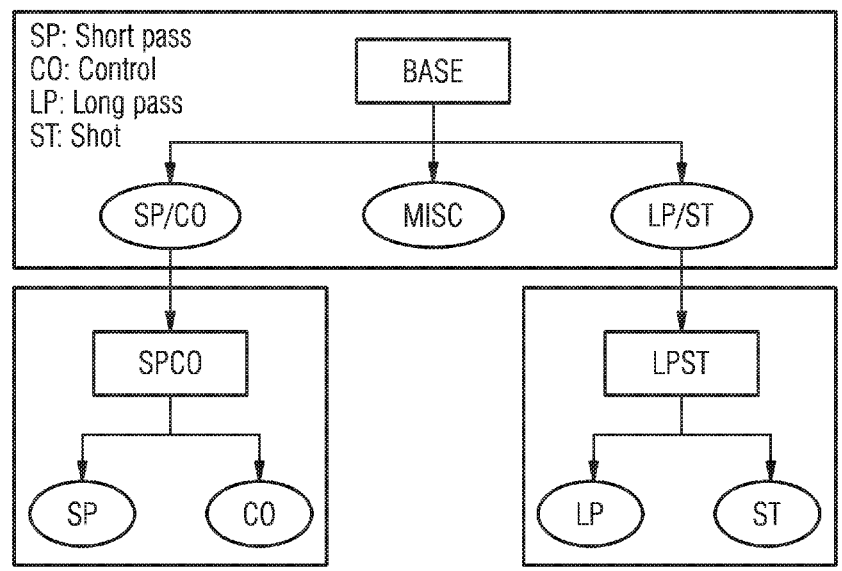
FIG. 12 shows a two-step event classification using event groups.

As shown in FIG. 12, method step 87 may first discriminate between two event groups ("SP/CO" and "LP/ST"). In a further classification step, if one of the event groups has been determined in the first classification step, one of the events in this group is determined. Thus, in FIG. 12, the event "SP" or "CO" is determined into the group "SPCO" and the event "LP" or "ST" is determined into the group "LPST". In the first level, a MISC/NULL class may also be modelled including actions like running/jogging/tackling, which were not removed during outlier detection. Thus, two classification steps may be used. In general, however, only a single classification step or more than two classification steps may be used.

Based on the event detected as described above, feedback may be provided to the person. Thus, the person may be informed about his or her performance during training or a match. In some embodiments, such feedback is provided in real-time.

For example, while the person wearing the sensor assembly 12 is performing a sports activity, the central processing unit 36 in the sensor assembly 12 may process the sensor data and generate certain feedback data, such as steps taken, running distance, calories burned, a count of kicks, passes, and shots.

Feedback may be provided to the person based on the estimated event. Thus, the person may be informed about his/her performance during training or a match. Such feedback may be provided in real-time. For example, feedback may be provided on a display 313 of the sensor assembly 12 or of a smartphone (for example, showing running distance and number of shots), on a display of a watch, or on an external display that is arranged, for example, at a sports ground.

Feedback may also be provided not in realtime. For example, feedback may be provided after an activity (after a match or training) in a locker room (on a display mounted on a wall or on a person's electronic device like a smartphone, tablet PC), sports area (a display in a stadium, hall, field) or at home. To this end, feedback data may be stored in a database or cloud storage, as described above.

Furthermore, summary statistics may be provided based on the determined event. In this way, the statistics may be tailored to specific classes of events. For example, in a soccer application, statistics about the number and intensity of shots, shot speed, time on ball, number of long passes and short passes, duration of dribblings, running time with/without ball, time of no movement, juggling, and performed tricks may be provided. Summary statistics for basketball may include number of passes and dribblings, time of ball possession, and intensity of jumps. Summary statistics for tennis may include number of hits, estimated ball speeds, the percentage of forehand and backhand hits, and number and intensity of services. Those statistics may be provided if a tennis player is equipped with a sensor assembly 12 near his hand. If the tennis player is additionally equipped with a sensor assembly 12 near one or both feet, running statistics may also be provided, such as the total distance and number of sprints (to the net).

Embodiments of an algorithm for ball speed estimation comprises preprocessing, feature extraction, and regression. During the preprocessing step, a window with a fixed size, for example, around the energy rich regions of the sensor data, is defined. Features are computed based on the sensor data in the window, such as number of extreme points, mean, variance, skewness, kurtosis, spline interpolation or maximum amplitude. Additional features may be computed, for example, on the signal magnitude vector signal of the accelerometer. During the regression step, different approaches may be applied, such as Support Vector Regression or linear regression. Details of Support Vector Regression may be found in Alex J. Smola and Bernhard Schölkopf, "A tutorial on support vector regression", Statistics and Computing, 14(3): 199-222, 2004.

As may be seen in FIG. 9, a maximum range of the sensor may be reached during a high-intensity event. To overcome saturation, which is a drawback, a sensor with a higher range may be used. By using only one sensor, for example, one accelerometer, there is a trade-off between a low sensor range with a high resolution, and a high sensor range with a low resolution. To exploit the benefits of both sensor types, sensor fusion techniques may be applied.

Instead of using the above mentioned regression types, principle component regression may be used which enables the reduction of feature dimensions and deals with the problem of multicollinearity. A detailed overview of principle component regression may be found in William F. Massy, "Principal Components Regression in Exploratory Statistical Research", Journal of the American Statistical Association, 60(309): 234-256, 1965.

The algorithms described so far focus on classification of soccer-specific actions, so the final output of the data analysis is a chronological sorted list of actions. To sort the list of actions according to their importance, sensor-based ranking algorithms may be applied. In a ranking algorithm, different action models may be established and applied to pre-segmented sensor data. The goal of each action model is to compute one score for each pre-segmented action. The list of actions is sorted by score, in a descending order. The generic architecture of action models consist of preprocessing, feature extraction, and classification. In the following paragraph, the action model SHOT_ON_GOAL is described. For each pre-segmented action, the score gives information about the probability that this action contains a shot on the goal.

In the preprocessing step, the sensor data of accelerometer and gyroscope is normalized, for example, between −1 and 1, and combined energy is computed. The combined energy is defined as the summation of the signal magnitude vector of the normalized accelerometer and the gyroscope signals. A window is further shifted over the combined energy signal. Size of the window is chosen as the duration of a typical shot. Output of the window contains maximum observed energy and corresponding window borders. The preprocessing step further includes ball contact detection by applying high-pass filtering and finding the maximum in the energy signal of the accelerometer signal. The preprocessing step further includes automatic leg alignment, in which legs are classified as an event leg and a supporting leg. The event leg is the leg which performed the shot. The leg with the highest angular velocity in the sagittal plane is defined as the event leg.

In the feature extraction step, features like duration of saturation in the linear acceleration, minimum angular velocity in the sagittal plane during the saturation phase, and energy in the supporting leg signals are computed.

In the classification step, among other classifiers, the Support Vector Machine may be implemented. The posterior probability of the classifier is defined as the score of the current action.

The window borders, which correspond to the maximum observed energy may be used to define a time in the highlight video when special video effect should be applied, such as "high-contrast illumination" or "ball on fire".

For further interesting actions, additional action models may be developed. A special action model is a manual triggering event, such as tapping three times on the sensors. This event gives the player a chance to define scenes, which should be available in the final highlight reel.

Since each action model computes one score for each pre-segmented action, a final ranking of the actions has to be defined. Different schemes may be applied. Scores of the single action models may be weighted and combined to get a final score and a final ranking. Different action models may further be prioritized, resulting in a higher position in the sorted list of actions.

The list of returned actions may be reduced further by defining a threshold for the posterior probability or the number of actions that should be returned.

The action models described so far are based on the sensor data of a single player. The ranking of the actions may be improved by integrating the information of team mates and opponents, for example, the higher the number of players involved in the action, the higher the score. The ranking of actions may be improved by integrating the video data. Different algorithms for player and ball tracking may be integrated into the processing pipeline.

The method also may be designed such that the system works without the a-priori knowledge about sensor orientation. A low pass filter may be applied to the vertical axis of the accelerometer signal. Periods of standing may be detected based on thresholding techniques. Depending on a sign of the standing periods, the orientation of the sensor may be determined. A wrong orientation may be detected and corrected by applying this procedure.

The method may also be designed such that the system works if one sensor is defective. In this case, the signal magnitude area is computed for the accelerometer signal and used as a ranking score.

The method also may include a goal detection, based on player fusion. Players show a specific behavior after a goal is performed: most of the players stop for a short time and walk slowly. This behavior may be analyzed by fusing the sensor data of different players. Based on this detection special effects may be applied to the highlight video at the end.

Instead of using generic signal processing features as regression input, biomechanical-driven features may be used, which are derived from the sensor data of multiple sensor positions such as pelvis, thigh, shank, ankle, and foot. The biomechanical modeling includes the detection of different phases of the kick, for example, backswing, leg cocking, leg acceleration, and follow through, and computation of lower leg velocity. Knee angle and knee moment may be computed using the relative orientation of the thigh and shank. The orientation of the segments may be determined by an Extended Kalman Filter. Fusing different sensors increases the accuracy of ball speed estimation systems.

Instead of using handcrafted feature extraction in classification and regression tasks, deep learning techniques may be applied to the classification of soccer-specific actions or estimation of ball speed. Deep learning refers to a set of machine learning approaches, in which supervised and/or unsupervised approaches, such as deep convolutional neural networks, deep belief networks, or autoencoders are applied to automatically learn hierarchical representations in deep architectures.

Summary statistics obtained by the method described herein may be combined with a video showing detected events of a certain player (for example, all his shots). In this way, a combined summary or feedback is obtained. The combination of video and statistics may be performed on the device 14 or may be performed on a consumer device, such as a mobile device 51a, 51b (a smartphone, tablet PC, smartwatch), desktop PC 51c or notebook 51d.

Summary statistics based on the detected event (and optionally a generated video of certain events) may be transferred to other people like a trainer, spectators or other people interested in those statistics. The transfer may be over the internet via a live stream. The transfer may be based on media such as Wifi, WLAN, BT, BTLE, NFC, RFID, USB, Ethernet, and Thunderbolt. Based on the summary statistics (and optionally the generated video of certain events), the player may obtain feedback from a trainer or a scout as will be described below.

Furthermore, based on the summary statistics (an optionally the generated video of certain events) a special area in a store or a stadium may be unlocked, depending on how well the player performed. For example, if the player achieved a certain number of ball contacts during a match, he is awarded access to a certain area in a store or stadium.

The sensor data also may be used to provide a step-over counter (the number of step overs), a football activity monitor, a keepy-uppy tracker (counting ball contacts while juggling the ball), "around the world" (holding the ball up with one leg and trying to move the leg around the ball before it hits the ground), or a 1-on-1 counter (counting how often the player engaged in a one-on-one situation on the field, for example trying to bypass and/or tricking the opponent). For example, the sensor data may be analyzed to determine the number of ball contacts a player had without allowing the ball to hit the ground (keepy uppy). The statistics mentioned above may be determined based on corresponding detected events, an event may be the contact of a foot with the ball (for keepy-uppy) or a circular movement (for "around the world").

If an event associated with a kick is detected, speed of a ball may be estimated based on the sensor data. Thus, the person may obtain feedback about his/her kicking performance. The ball speed may be estimated by preprocessing, feature extraction and regression. The sensor data may be segmented, and features may be computed for each segmented region. Different regression techniques may be applied, which use the computed features as input.

After a match (such as a soccer match of two teams, a tennis match of two players), summary statistics, together with a video compiled from detected events, may be automatically sent to a global database, such as a cloud for trainers, scouts, or other people to review the summary statistics and the video. Details of such data transmission have been provided with reference to FIG. 5. A trainer or scout may then access the cloud with a mobile device 51a, 51b, a desktop PC 51c, or a notebook 51d, as described with reference to FIG. 5, and study the video and/or summary statistics generated. Based thereon, the trainer or scout may provide feedback to the player who is featured in the video (for example, by posting a comment or a private note via a social media platform or by email, short message service, etc.). A scout may select the player for further evaluation.

Heatmaps may be created based on data provided by a satellite navigation system module 312, such that other persons may see where and when tricks, shots were made, on a map. A heatmap in this context is understood as a map that associates, with each location, a duration that the person spent at that particular location. The duration is then mapped to a color scheme. For example, a long duration is indicated by the color red, whereas a short location is indicated by the color blue. Intermediate values are indicated by corresponding intermediate colors (for example, colors from a spectrum of natural colors). The heatmap may be used to analyze where the person actually spent most of the time, for example, during a match. To this end, the heatmap may be overlaid with a picture or schematic drawing of the playing field (for example, a football ground, tennis court, basketball field). In this way, the heatmap shows the position of the person, in some embodiments.

Tricks performed by a professional player may be recorded via a sensor assembly 12 and camera 11 or cameras 11a, 11b, 11c, 11d, 11e. Other persons are asked to repeat the trick and are rewarded or awarded, depending on how well they repeated the trick. Instead of a professional player, the trick may be performed by an amateur, recreational player, or any player or person.

Based on the recorded sensor data, the person may obtain points or scores. For example, depending on how long and how intense the person performed a certain activity, such as soccer, basketball or tennis, the person is awarded points or scores. For example, if the person played soccer or basketball in a park or on a street, practiced tricks, or even played a soccer, basketball or tennis game on a PC or game console where the person is represented by an avatar, the person may be awarded corresponding points or scores. Certain events (such as shots, long passes, short passes, dribblings, tricks) extracted from the sensor data may be counted, and advantages, awards and/or rewards may be provided to the person, if he reaches a certain amount of events.

Points or scores may be awarded, in general, if the person is active. The sensor assembly 12 then operates like an activity tracker as has been described before. The more movements the person performs, the more points or scores he obtains.

The points or scores may unlock a special area in a store. For example, if the person reached a certain number of points or scores (such as 1.000), a special area in a store may be unlocked for him, and the person is granted access to that area. The special area may contain special offers like limited editions or collector's items. The area may be locked to other persons by an automatic door or barrier. If the person approaches the door or barrier, a wireless transceiver module 39 in the sensor assembly 12 may transmit a wireless signal (for example, via Wifi, WLAN, Bluetooth, Bluetooth Low Energy, Zigbee, ANT, ANT+) to a receiver near the door or barrier, which identifies the person. If the person has enough points or scores, the door or barrier may open and the person is granted access to the special area.

Alternatively, the special area may be part of an online store. The server on which the online store is hosted asks for the identity of the person, for example, by name and/or password and subsequently retrieves the number of points or scores associated with the person from another server, such as a cloud server 52. If the person has enough points or scores, he may be allowed to navigate to a special area in the online store with special offers, like limited editions or collector's items.

In the context of a store or online store, the person may be rewarded with discounts based on his points or scores. For example, for every point or score, a discount may be rewarded either in percent (for example, one percent per 100 points/scores) or as a fixed amount (for example, one EUR or Dollar per 100 points/scores).

Furthermore, the person may be granted access to exclusive media content based on his points or scores. For example, if the person has a certain minimum amount of points/scores (for example, 1000), he is granted access to special sports media (such as video clips, workout music, photos) on a media server.

The points or scores also may be used to award the person with online batches. For example, if the person accumulated 1000 points or scores, he is awarded a bronze badge, if the player accumulated 5000 points, he is awarded a silver badge, if the player accumulated 10000 point, and he is awarded a gold badge. The badges may be shown on a social media profile of the player (such as facebook, twitter).

The points or scores also may be associated with the performance of a player's avatar, which he uses in a computer game. The more points or scores the player accumulates during certain activities (for example, soccer, basketball, tennis, everyday activities), the better the avatar may perform. For example, the avatar may obtain certain skills and/or equipment, if the player reaches a certain number of points or scores. For example, a soccer avatar may obtain the ability to perform bicycle kicks and/or a better pair of shoes, if the player reaches 1000 points. The performance of an entire team of avatars may be increased, if their associated players increase their number of points or scores. For example, the performance of a team of soccer players in a real match may determine the performance of their team of associated avatars in a soccer game.

The sensor assembly 12 also may be used to track when the person visits a stadium to watch a match. For example, the stadium may be equipped with a RFID/NFC tag, a Bluetooth or BTLE beacon, or a WLAN hotspot to communicate with the sensor assembly 12 via a wireless transceiver module 39. In this way, an identifier, which is associated with the stadium, may be transmitted to the sensor assembly 12 and stored in the memory 13. This information may be transmitted to a person's social media profile (for example, via the wireless transceiver module 39 or via a connector 38) later. Thus, the social media profile would show information that the person visited the stadium to watch a certain match.

The sensor assembly 12 may transmit an identifier associated with the sensor assembly 12 to a receiver installed in the stadium, and the identifier may be transmitted from the receiver to a server in the Internet (such as a social media platform server), which shows the information that the person watched the match.

Instead of a stadium, a sports outfitters shop may be equipped with a RFID/NFC tag, a Bluetooth or BTLE beacon, a WLAN hotspot to communicate with the person's sensor assembly 12. In the manner described above, information that the person visited the shop may be automatically posted on the person's social media profile.

The present invention may be used with a wide spectrum of activities, in particular, sports activities. For example, when playing basketball, meaningful actions or events may be detected during play, such as a dunk, jump shot, 360, cross over, shot, and shot block. A highlight reel of a basketball game may be generated, based on the method of the present invention. In the case of basketball, more than one sensor assembly 12 may be worn by a player. For example, one sensor assembly 12 may be worn on one of the player's arms, another sensor assembly 12 may be worn on one of the player's legs. In general, sensor assemblies 12 may be worn at arbitrary locations of the body, such as on the hips. As described before, the sensor data from more than one sensor assembly 12 may be combined into a single time-series.

A sensor assembly 12 may be attached to or integrated into a basketball to record movements of the basketball. The sensor data of the basketball may then be used to enhance detection of events by combining the sensor data from the basketball with the sensor data from the sensor assemblies 12 worn by basketball players.

Other sports activities include running and tennis. If the present invention is applied to tennis, a summary video ("highlight reel" or "show reel") may show, for example, all forehands or all backhands and/or all services of a player. During a doubles match, which involves more than one player, the summary video may show the mentioned events of a certain player only.

The sensor assembly 12 may be worn by a runner (for example, near one or both of his ankles), and the sensor data may be stored in the memory 13, during a run. The sensor data may be analyzed later, as described herein, to analyze the running technique of the runner. For example, the sensor data may be used to detect how the runner's feet touch the ground and how he pronates and supinates. Changes in the runner's movements may be identified over time. In this way, it may be determined when the runner started to become fatigued. Power output or burned calories of the runner over time may be calculated or a total of the power output may be obtained.

As already described, the camera 11 or the cameras 11*a*, 11*b*, 11*c*, 11*d*, 11*e* may be a smartphone camera. A camera of a tablet PC, notebook, camera stick, or smartwatch also may be used. Also, an action cam, such as Gopro®, may be used. If the sensor data is processed (for event detection and association of an event with a video frame) on a device that is separate from the camera, the video may be transmitted to the device via a wired (for example, via USB, Ethernet, Thunderbolt) or wireless connection (for example, via Wifi, WLAN, BT, BTLE, NFC, RFID, ANT®, ANT+, ZigBee®).

The video generated from the at least one video frame associated with the detected event (the summary video, "highlight reel" or "show reel") may be shown on a video wall at a soccer pitch, for example. To this end, the device 14, which processes the sensor data and the recorded video or videos, may be connected to the video wall via wired (for example, via USB, Ethernet, Thunderbolt) or wireless connection (for example, via Wifi, WLAN, BT, BTLE, NFC, RFID, ANT®, ANT+, ZigBee®) to transfer the summary video to the video wall.

In the following, further examples are described to facilitate the understanding of the invention:

1. Method for associating frames in a video of an activity of a person with an event, comprising the steps:

recording a video of an activity of a person;

storing a time-series of a plurality of sensor data (82) obtained from a sensor assembly (12) comprising at least one sensor (31, 32, 33, 34, 35) coupled to the person while the person is performing the activity;

synchronizing the video with the plurality of sensor data (82);

detecting an event in the time-series; and associating the event with at least one corresponding frame in the video showing the event.

2. Method according to the preceding example, further comprising a step of using the at least one frame to generate a second video showing a plurality of predetermined events of the activity of the person.

3. Method according to any one of the preceding examples, wherein the step of synchronizing the video with the plurality of sensor data (82) comprises detecting a predetermined synchronization event in the time-series and in at least one frame in the video.

4. Method according to any one of the preceding examples, wherein the activity is a sports activity.

5. Method according to any one of the preceding examples, wherein the activity is soccer.

6. Method according to any one of the preceding examples, wherein the event is a kick, a short pass, a long pass, a shot, or control of a ball.

7. Method according to any one of the preceding examples, wherein the at least one sensor (31, 32, 33, 34, 35) is an accelerometer (31), a gyroscope (32), or a magnetic field sensor (33).

8. Method according to any one of the preceding examples, wherein the sensor assembly (12) comprises two or more sensors (31, 32, 33, 34, 35) and the sensor data (82) from each of the two or more sensors (31, 32, 33, 34, 35) is combined in the time-series.

9. Method according to any one of the preceding examples, wherein the step of recording the video of the activity of the person comprises recording the video with at least two cameras.

10. Method according to any one of the preceding examples, further comprising a step of saving the video in a database.

11. Method according to any one of the preceding examples, wherein the step of detecting an event in the time-series comprises:

preprocessing (83) the time-series;

segmenting (84) the time-series in a plurality of windows;

detecting (85) outliers;

extracting (86) a plurality of features from the time-series in each of the plurality of windows; and estimating (87) an event class associated with the plurality of windows based on the plurality of features extracted from the time-series in each of the plurality of windows.

12. Method according to the preceding example, wherein the step of preprocessing (83) comprises low pass filtering and downsampling.

13. Method according to any one of examples 11 to 12, further comprising a step of segmenting (84) a preprocessed time-series into a plurality of windows with a fixed window size.

14. Method according to example 13, further comprising a step of centering the plurality of windows at maximum peaks in the time-series.

15. Method according to any one of examples 11 to 14, further comprising a step of removing the plurality of windows with a maximum peak at a center below a threshold.

16. Method according to any one of examples 11 to 15, further comprising a step of adapting a window size to a shape and/or an extent of the event.

17. Method according to any one of examples 11 to 16, further comprising a step of detecting outliers by a Rule based system and/or a one-class Support Vector Machine.

18. Method according to the preceding example, wherein the plurality of features are computed in the plurality of windows which do not comprise outliers.

19. Method according to any one of examples 11 to 18, wherein the plurality of features are based on at least one of temporal, spatio-temporal, spectral, or ensemble statistics by applying, for example, wavelet analysis, principal component analysis, PCA, or Fast Fourier Transform, FFT.

20. Method according to any one of examples 11 to 19, wherein the plurality of features are based on at least one of simple mean, normalized signal energy, movement intensity, signal magnitude area, correlation between axes, maximum value in a window, minimum value in a window, maximum detail coefficient of a wavelet transform, correlation with a template, projection onto a principal component of a template, or distance to an eigenspace of a template, spectral centroid, bandwidth, or dominant frequency.

21. Method according to any one of examples 11 to 20, further comprising a step of reducing a number of the plurality of features by at least one feature selection procedure.

22. Method according to any one of examples 11 to 21, wherein the event class is estimated based on a Bayesian classifier such as Naïve Bayes classifier, a maximum margin classifier such as Support Vector Machine, an ensemble learning algorithm such as AdaBoost classifier and Random Forest classifier, a Nearest Neighbor classifier, a Neural Network classifier, a Rule based classifier, or a Tree based classifier.

23. Method according to any one of examples 11 to 22, further comprising a step of fusing decisions of several classifiers to estimate a final prediction of the event class.

24. Method according to any one of examples 11 to 23, further comprising a step of detecting the event by matching the event with a template using correlation, Matched Filtering, Dynamic Time Warping, or Longest Common Subsequence (LCS) and its sliding window variant, warping LCS.

25. Method according to any one of examples 11 to 24, wherein estimating the event class comprises discriminating between merged event groups containing events that are similar in shape, and discriminating between single events belonging to one specific group.

26. Method according to any one of examples 11 to 25, wherein the step of estimating is based on a classifier, which has been trained based on a supervised training.

27. Method according to any one of the preceding examples, further comprising providing summary statistics based on at least the detected event.

28. Method according to any one of the preceding examples, further comprising a step of estimating a ball speed based on the time-series, if the event detected is associated with a kick.

29. System for associating frames in a video of an activity of a person with an event, being adapted to perform the method according to any one of the preceding examples.

30. System for associating frames in a video of an activity of a person with an event comprising:
at least one camera (11, 11a, 11b, 11c, 11d, 11e) for recording a video of an activity of a person;
at least one sensor assembly (12) comprising at least one sensor (31, 32, 33, 34, 35) capable of being coupled to a person while the person is performing the activity;
a memory (13) for storing a time-series of a plurality of sensor data (82) obtained from the at least one sensor (31, 32, 33, 34, 35); and
a processor (15) for synchronizing the video with the plurality of sensor data (82), detecting an event in the time-series, and associating the event with at least one corresponding frame in the video showing the event.

31. System according to example 30, wherein the sensor assembly (12) is adapted to be coupled to a body of the person.

32. System according to any one of examples 30 to 31, wherein the sensor assembly (12) is adapted to be attached to a strap (41) or a bracelet.

33. System according to any one of examples 30 to 32, wherein a wearable device comprises the sensor assembly (12).

34. System according to any one of examples 30 to 33, wherein the sensor assembly (12) comprises the memory (13).

35. System according to any one of examples 30 to 34 comprising at least two cameras.

36. Computer program comprising instructions which cause a computer to perform the method according to any one of examples 1 to 28, when executed.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method comprising:
recording a video of an activity of a person;
storing a time-series comprising a plurality of sensor data obtained from a sensor assembly, wherein the sensor assembly comprises at least one sensor coupled to the person while the person is performing the activity;
synchronizing the video with the plurality of sensor data;
detecting an event in the time-series by at least:
preprocessing the time-series;
segmenting the time-series into a plurality of windows;
detecting each of the plurality of windows comprising at least one outlier;
extracting a plurality of features from the time-series in each of the plurality of windows; and
estimating an event class for each of the plurality of windows based on the plurality of features extracted from the time-series in each of the plurality of windows; and
associating the event with at least one corresponding frame in the video showing the event.

2. The method according to claim 1, further comprising:
generating a second video showing the event of the activity of the person, wherein the second video comprises the at least one corresponding frame.

3. The method according to claim 1, wherein synchronizing the video with the plurality of sensor data comprises:
detecting a predetermined synchronization event in the time-series; and
detecting the predetermined synchronization event in at least one frame in the video.

4. The method according to claim 1, wherein the activity comprises a sports activity.

5. The method according to claim 1, wherein the activity is soccer.

6. The method according to claim 1, wherein the event comprises at least one of: a kick, a short pass, a long pass, a shot, or an act of controlling a ball.

7. The method according to claim 1, wherein the at least one sensor comprises at least one of: an accelerometer, a gyroscope, or a magnetic field sensor.

8. The method according to claim 1, wherein the sensor assembly comprises at least two sensors, and wherein the plurality of sensor data from each of the at least two sensors is combined in the time-series.

9. The method according to claim 1, wherein recording the video of the activity of the person comprises recording the video with at least two cameras.

10. The method according to claim 1, further comprising:
saving the video in a database.

11. The method according to claim 1, wherein preprocessing the time-series comprises low pass filtering and downsampling.

12. The method according to claim 1, wherein each of the plurality of windows comprises a fixed sized window.

13. The method according to claim 12, further comprising:
centering each of the plurality of windows at a center of the fixed size window, wherein the center corresponds to a maximum peak in the time-series.

14. The method according to claim 13, further comprising:
removing each of the plurality of windows in which the maximum peak at the center is below a threshold.

15. The method according to claim 1, further comprising:
adapting a window size of the plurality of windows to at least one of: a shape or an extent of the event.

16. The method according to claim 1, wherein detecting each of the plurality of windows comprising at least one outlier comprises using at least one of: a Rule based system or a one-class Support Vector Machines.

17. The method according to claim 1, wherein the plurality of features are extracted from the plurality of windows which do not comprise the at least one outlier.

18. The method according to claim 1, wherein the plurality of features are based on at least one of temporal statistics, spatio-temporal statistics, spectral statistics, or ensemble statistics by applying at least one of a wavelet analysis, a principal component analysis, or a Fast Fourier Transform.

19. The method according to claim 1, wherein the plurality of features comprise at least one of a simple mean, a normalized signal energy, a movement intensity, a signal magnitude area, a correlation between axes, a maximum value in a window, a minimum value in a window, a maximum detail coefficient of a wavelet transform, a correlation with a template, a projection onto a principal component of a template, or a distance to an eigenspace of a template, a spectral centroid, a bandwidth, or a dominant frequency.

20. The method according to claim 1, further comprising: reducing a number of the plurality of features using at least one feature selection procedure.

21. The method according to claim 1, wherein estimating the event class is based on at least one classifier, wherein the at least one classifier comprises at least one of: a Bayesian classifier, a Naïve Bayes classifier, a maximum margin classifier, an AdaBoost classifier, a Random Forest classifier, a Nearest Neighbor classifier, a Neural Network classifier, a Rule based classifier, or a Tree based classifier.

22. The method according to claim 21, further comprising:
fusing at least two decisions of the at least one classifier to estimate a final prediction of the event class.

23. The method according to claim 1, wherein detecting the event comprises matching the event to a template based on correlation, Matched Filtering, Dynamic Time Warping, or Longest Common Subsequence (LCS) and its sliding window variant, warping LCS.

24. The method according to claim 1, wherein estimating the event class comprises:
discriminating between at least two merged event groups containing at least two events that are similar in shape; and
discriminating between the at least two events belonging to one specific group.

25. The method according to claim 1, wherein estimating the event class is based on at least one classifier that has been trained based on a supervised training.

26. The method according to claim 1, further comprising:
providing a plurality of summary statistics, wherein at least a portion of the plurality of summary statistics is based on the event.

27. The method according to claim 1, further comprising:
estimating a speed of a ball based on the time-series if the event is associated with a kick.

28. A system comprising:
at least one camera configured to record a video of an activity of a person;
at least one sensor assembly comprising at least one sensor, the sensor assembly configured to be coupled to the person while the person is performing the activity;
a non-transitory memory configured to store a time-series comprising a plurality of sensor data obtained from the at least one sensor; and
a processor configured to:
synchronize the video with the plurality of sensor data;
detect an event in the time-series by at least:
preprocessing the time-series;
segmenting the time-series into a plurality of windows;
detecting each of the plurality of windows comprising at least one outlier;
extracting a plurality of features from the time-series in each of the plurality of windows; and
estimating an event class for each of the plurality of windows based on the plurality of features extracted from the time-series in each of the plurality of windows; and
associate the event with at least one corresponding frame in the video showing the event.

29. The system according to claim 28, wherein the sensor assembly is configured to be coupled to a body part of the person.

30. The system according to claim 28, wherein the sensor assembly is configured to be attached to at least one of: a strap or a bracelet.

31. The system according to claim 28, further comprising: a wearable device comprising the sensor assembly.

32. The system according to claim 28, wherein the sensor assembly comprises the non-transitory memory.

33. The system according to claim 28, wherein the at least one camera comprises at least two cameras.

34. A non-transitory computer-readable medium comprising one or more software applications configured to be executed by a processor, the one or more software applications configured to:
record a video of an activity of a person;
store a time-series comprising a plurality of sensor data obtained from a sensor assembly, wherein the sensor assembly comprises at least one sensor coupled to the person while the person is performing the activity;
synchronize the video with the plurality of sensor data;
detect an event in the time-series by at least:
preprocessing the time-series;
segmenting the time-series into a plurality of windows;
detecting each of the plurality of windows comprising at least one outlier;
extracting a plurality of features from the time-series in each of the plurality of windows; and
estimating an event class for each of the plurality of windows based on the plurality of features extracted from the time-series in each of the plurality of window; and
associate the event with at least one corresponding frame in the video showing the event.

35. The non-transitory computer-readable medium according to claim 34, wherein the one or more software applications is further configured to:
generate a second video showing the event of the activity of the person, wherein the second video comprises the at least one corresponding frame.

36. The non-transitory computer-readable medium according to claim 34, wherein synchronize the video with the plurality of sensor data comprises:
detecting a predetermined synchronization event in the time-series; and
detecting the predetermined synchronization event in at least one frame in the video.

* * * * *